US012296525B2

(12) United States Patent
Filler et al.

(10) Patent No.: US 12,296,525 B2
(45) Date of Patent: May 13, 2025

(54) SIGNALING ARRANGEMENTS EMPLOYING MOLDED THERMOPLASTICS

(71) Applicant: Digimarc Corporation, Beaverton, OR (US)

(72) Inventors: Tomas Filler, Beaverton, OR (US); Vojtech Holub, Portland, OR (US); Hugh L. Brunk, Portland, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 17/347,358

(22) Filed: Jun. 14, 2021

(65) Prior Publication Data

US 2021/0387399 A1    Dec. 16, 2021

Related U.S. Application Data

(60) Provisional application No. 63/076,917, filed on Sep. 10, 2020, provisional application No. 63/040,487, (Continued)

(51) Int. Cl.
*B29C 33/38* (2006.01)
*B29C 33/10* (2006.01)
(Continued)

(52) U.S. Cl.
CPC ............ *B29C 59/02* (2013.01); *B29C 59/002* (2013.01); *G06K 19/06037* (2013.01); *B29K 2101/12* (2013.01)

(58) Field of Classification Search
CPC .................. B29C 59/02; B29C 59/002; G06K 19/06037; B29K 2101/12
See application file for complete search history.

(56) References Cited

U.S. PATENT DOCUMENTS 3,919,379 A    11/1975   Smarook
4,644,151 A *  2/1987   Juvinall ............... B07C 5/3408
                                                     235/494
(Continued)

FOREIGN PATENT DOCUMENTS

DE    102006019248 A1 * 10/2007    ............... G09F 3/00
EP        0399591 A1     11/1990
(Continued)

OTHER PUBLICATIONS

[NPL-1] Niemeyer-Stein (DE 102006019248 A1); Oct. 25, 2007 (EPO machine translation to English). (Year: 2007).*

(Continued)

*Primary Examiner* — Donald M Flores, Jr.
(74) *Attorney, Agent, or Firm* — Klarquist Sparkman, LLP

(57) ABSTRACT

A thermoplastic resin, such as PET, is molded to define a 2D code signal, such as a digital watermark pattern. The mold can comprise an array of hole or spike features, some of which are directly vented to atmospheric pressure. A network of channels can link the other features to the directly-vented features, so all features are vented. A mold comprising spike features can form a digital watermark pattern on an item such that the watermark payload is decodable both from the side of the item that contacted the mold, and also from the opposite, non-contact side of the item. To aid entry of viscous thermoplastic among the very fine elemental features of a mold representing a watermark signal pattern, the features can be overlapped, forming a connected binary mark having larger features. A variety of other improvements and arrangements are also detailed.

27 Claims, 17 Drawing Sheets

Related U.S. Application Data filed on Jun. 17, 2020, provisional application No. 63/038,735, filed on Jun. 12, 2020.

(51) Int. Cl.

| | |
|---|---|
| *B29C 33/42* | (2006.01) |
| *B29C 45/26* | (2006.01) |
| *B29C 45/37* | (2006.01) |
| *B29C 51/30* | (2006.01) |
| *B29C 51/40* | (2006.01) |
| *B29C 59/00* | (2006.01) |
| *B29C 59/02* | (2006.01) |
| *B42D 25/333* | (2014.01) |
| *G06K 19/06* | (2006.01) |
| *B29K 101/12* | (2006.01) |

(56) References Cited

U.S. PATENT DOCUMENTS

| | | | | |
|---|---|---|---|---|
| 4,990,792 | A | | 2/1991 | Frei |
| 5,028,769 | A | | 7/1991 | Claypool |
| 5,926,556 | A | | 7/1999 | Douglas |
| 6,390,368 | B1 | | 5/2002 | Edwards |
| 6,533,181 | B1 | * | 3/2003 | Roxby ............... G06K 1/121 |
| | | | | 235/494 |
| 6,791,592 | B2 | | 9/2004 | Assa |
| 6,882,738 | B2 | | 4/2005 | Davis |
| 7,878,396 | B2 | * | 2/2011 | Wishnatzki ......... G06Q 50/28 |
| | | | | 235/462.01 |
| 2004/0086151 | A1 | | 5/2004 | Brundage |
| 2006/0157483 | A1 | * | 7/2006 | Evans ............... B65D 21/0234 |
| | | | | 220/4.22 |
| 2006/0208090 | A1 | | 9/2006 | Dahl |
| 2010/0102032 | A1 | | 4/2010 | Bathelet |
| 2011/0240739 | A1 | | 10/2011 | Delaigle |
| 2012/0263902 | A1 | * | 10/2012 | Hanan ............... B29B 11/14 |
| | | | | 428/36.92 |
| 2014/0263667 | A1 | * | 9/2014 | Mege ............... G06K 19/06037 |
| | | | | 235/494 |
| 2016/0070999 | A1 | | 3/2016 | Pranov |
| 2017/0043913 | A1 | * | 2/2017 | Strachan ............... B65D 1/40 |
| 2017/0046549 | A1 | * | 2/2017 | Ulyate ............... G06K 19/06018 |
| 2018/0345323 | A1 | | 12/2018 | Kerver |
| 2019/0139176 | A1 | * | 5/2019 | Stach ............... G06T 3/20 |
| 2019/0306385 | A1 | | 10/2019 | Sharma |

FOREIGN PATENT DOCUMENTS

| | | |
|---|---|---|
| WO | 0200068 A1 | 1/2002 |
| WO | 2020186234 | 9/2020 |
| WO | 2021078842 | 4/2021 |
| WO | 2021252298 | 12/2021 |
| WO | 2021253011 | 12/2021 |

OTHER PUBLICATIONS

[NPL-2] "2D Barcode Fonts: PDF417 Barcode"; ConnectCode (2010); <https://www.barcoderesource.com/PDF417Barcode.pdf>. (Year: 2010).*
[NPL-3] "PDF417 2D Barcode Information & Tutorial"; IDAutomation (Oct. 15, 2018); <https://www.barcodefaq.com/2d/pdf417/>. (Year: 2018).*
International Preliminary Report on Patentability dated Sep. 26, 2022, in application PCT/US2021/037276 (published as WO2021253011).
Applicant reply to Written Opinion of IPEA, dated Jun. 23, 2022, in application PCT/US2021/037276 (published as WO2021253011).
Replacement claims submitted Jun. 23, 2022, in application PCT/US2021/037276 (published as WO2021253011).
Written Opinion of the International Preliminary Examining Authority, dated May 2, 2022, in application PCT/US2021/037276 (published as WO2021253011).
Replacement claims showing specification support, submitted Jun. 23, 2022, in application PCT/US2021/037276 (published as WO2021253011).
International Search Report and Written Opinion for App. No. PCT/US2021/037276, dated Nov. 26, 2021, 8 pages.
DE102006019248a1, 2006, with machine translation.pdf.
Excerpts from corresponding PCT application PCT/US2021/036029 (WO2021252298).

* cited by examiner

141 REFERENCE SIGNAL COMPONENT

142 NTERPOLATED PAYLOAD COMPONENT

144 REFERENCE + 0.1253(PAYLOAD)

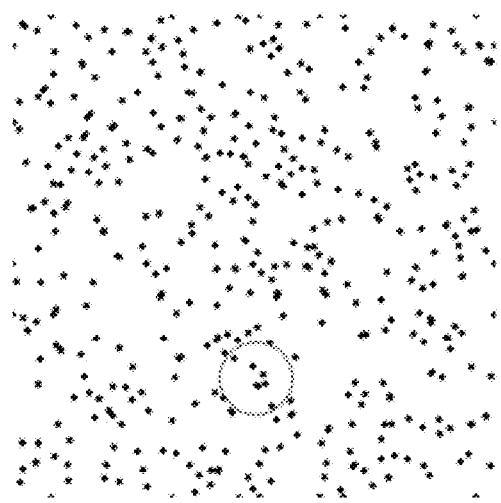
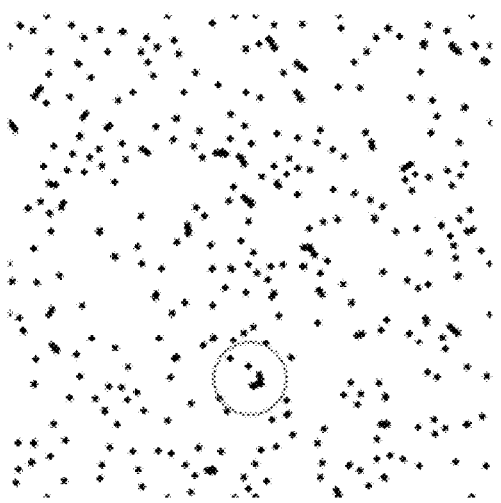
FIG. 24A
FIG. 24B
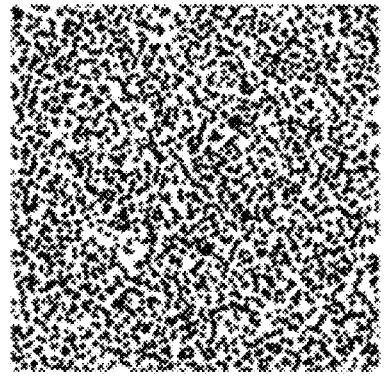
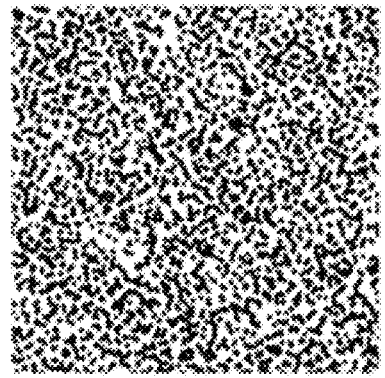
FIG. 25A
FIG. 25B
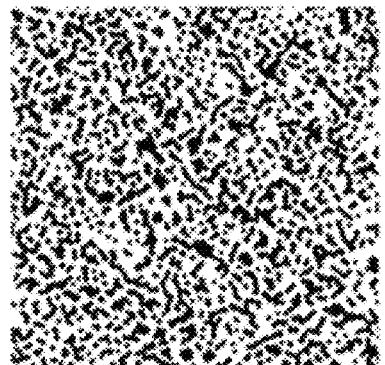
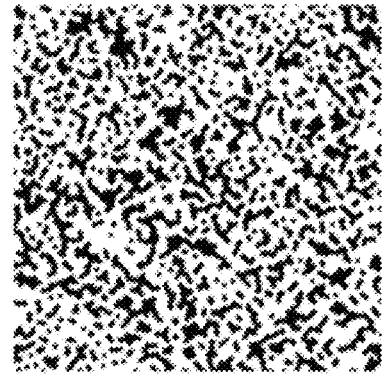
FIG. 25C
FIG. 25D

SIGNALING ARRANGEMENTS EMPLOYING MOLDED THERMOPLASTICS

RELATED APPLICATION DATA

This application claims priority to provisional U.S. patent applications 63/038,735, filed Jun. 12, 2020, 63/040,487, filed Jun. 17, 2020, and 63/076,917, filed Sep. 10, 2020.

The subject matter of this application is also related to, and expands on, that of pending U.S. patent application Ser. No. 16/435,292, filed Jun. 7, 2019 (published as 20190306385), Ser. No. 16/405,621, filed May 7, 2019 (published as 20190332840, issued as U.S. Pat. No. 11,062,108), Ser. No. 17/214,455, filed Mar. 26, 2021 (issued as U.S. Pat. No. 11,741,733), and Ser. No. 17/339,711, filed Jun. 4, 2021 (issued as U.S. Pat. No. 11,710,020), and international patent application PCT/US20/22801, filed Mar. 13, 2020 (published as WO2020186234).

The foregoing applications are incorporated herein by reference.

INTRODUCTION

Thermoforming is a process for shaping sheet plastic into various configurations, such as food trays, clamshells, lids for drink cups, etc. There are many varieties of thermoforming, but all are typically characterized by use of mechanical means, vacuum, and/or pressure to force a hot resin sheet against one or more shaped molds (often made of aluminum). After conforming to the mold, the shaped plastic is cooled, removed from the mold, and trimmed. Since thermoforming systems are well-known, conventional features associated with such systems aren't belabored in the following discussion.

Thermoforming often uses polyethylene terephthalate, or PET—a resin produced from terephthalic acid and ethylene glycol—but there are many variants. These include CPET (crystalline state), OPET (oriented film), EPET (suited for extrusion blow-molding), PETG (with glycols to reduce brittleness), APET (clear amorphous sheet commonly used in thermoforming), RPET (recycled), etc.

The earlier-cited patent applications disclose the use of thermoforming to both shape a plastic item, and also to impart a texture to the item surface that encodes a machine-readable code, e.g., a watermark pattern. The code conveys plural symbols of data that may indicate, e.g., an identity of the item, the item's contents, or information about recycling for the item.

FIG. 1 shows an excerpt of a mold 10 that has been shaped, by drilling, laser shaping, chemical etching, electrical discharge machining, CNC, or otherwise (generally referenced as "milling" herein), to include a pattern of cavities or voids 12. This pattern comprises the machine-readable code. When a sheet 14 of resin is shaped by such a mold, the plastic is driven—here by air pressure 16 applied from above—to extend into such holes. After release, the molded item has a series of surface protrusions corresponding to those holes.

For most watermark patterns, the scales of the elemental marks (e.g., corresponding to the mold cavities) are of a very fine dimension, typically on the order of 0.005 to 0.05 inches in width, and most commonly 0.005-0.02 inches.

Prior art arrangements for thermoforming plastics to convey watermark patterns have not been wholly successful. For example, prior art arrangements do not always satisfactorily produce the very fine-scale features needed.

Aspects of the present technology redress this and other difficulties of the prior art, and provide additional advantages.

The foregoing and other features of the present technology will be more readily apparent from the following detailed description, which proceeds with reference to the accompanying drawings.

BRIEF DESCRIPTION OF THE DRAWINGS

FIG. 24A shows a binary pattern, and FIG. 24B shows the pattern after application of a dilation-erosion smoothing process.

FIGS. 25A-25D show binary patterns resulting from application of dilation-erosion smoothing processes of different operator sizes.

DETAILED DESCRIPTION

Figure 1:
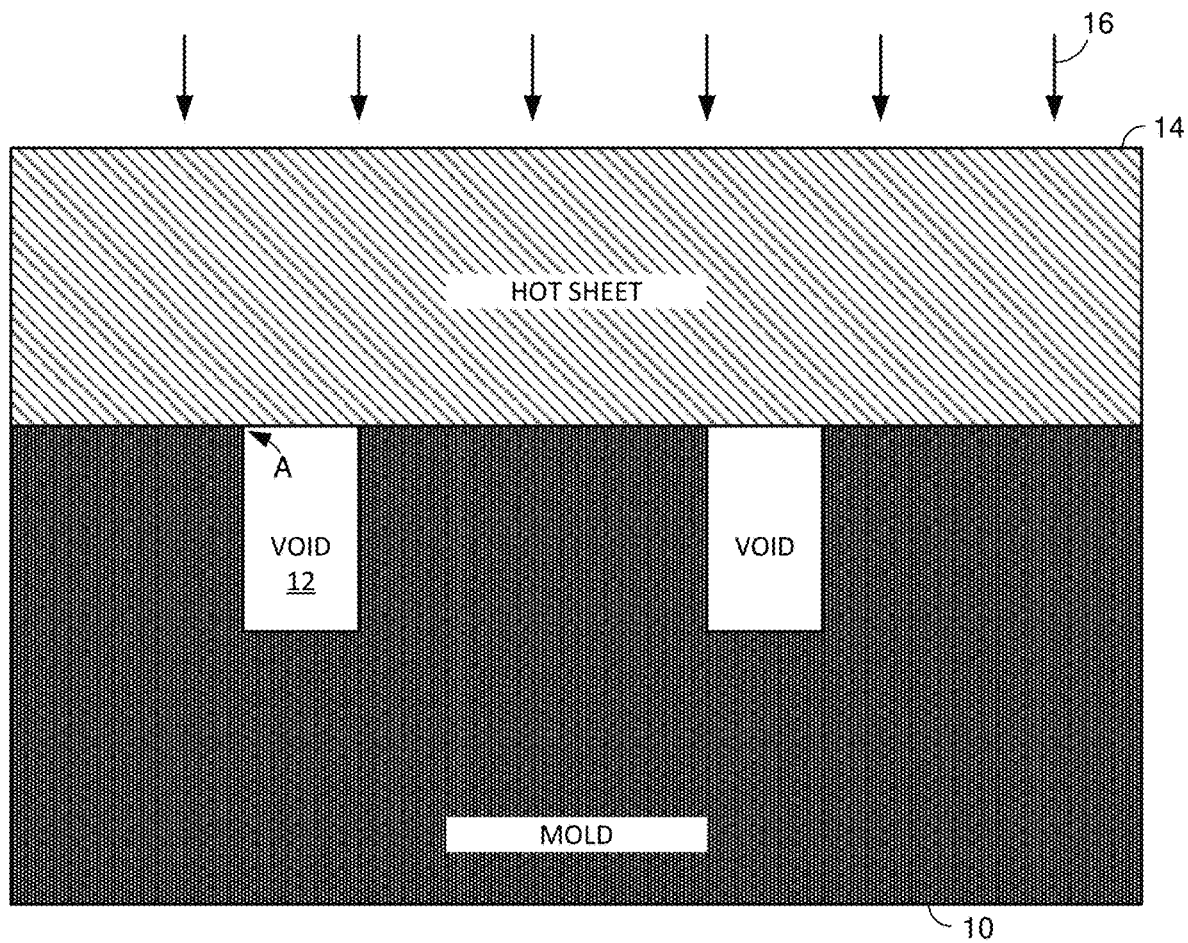
FIG. 1 shows a thermoforming arrangement in which a hot resin sheet is pressured-urged against a mold including voids.

Before proceeding further, it is helpful to review certain aspects of watermark technology. As detailed in cited U.S. publication 20190332840, an illustrative binary watermark pattern is a derivative of a so-called continuous tone watermark signal (pattern). The continuous tone pattern has two parts: a synchronization signal (sometimes termed a "reference signal") and a message signal. The synchronization signal is a summation of many 2D sinusoids (e.g., 16, 24 or 64) of different frequencies and phases. (Integer frequencies are desirably used, to permit seamless tiling of resultant blocks to span arbitrarily large areas of substrate.) When imagery depicting such pattern is transformed into a spatial frequency domain (as by a fast Fourier transform), the individual sinusoid components form a constellation of points in the (u,v) plane. The scale and rotation of this constellation, as compared to original values, reveal the scale and rotation at which the watermark pattern is depicted in the imagery. The phases of these points in the (u,v) plane indicate the translation, in x- and y-directions, at which the watermark pattern is depicted in the imagery. U.S. Pat. Nos. 6,590,996, 9,959,587 and 10,242,434 provide further information on these and other topics.

The message signal part of an exemplary continuous tone watermark pattern starts with a binary message, e.g., of 47 bits, which is concatenated with 24 corresponding CRC bits, and then convolutionally-encoded with a base rate of 1/13 to yield a series of 924 bits. 100 further bits, indicating a version identifier, are appended, yielding 1024 "signature" bits. Each of these bits is modulated with a sixteen element bipolar {+1/−1} noise sequence, yielding 16 bipolar "chips." Each of these chips is mapped to a different location within a 128×128 location array by a scatter table (i.e., one "chip" for each of the 16,384 locations).

The 2D synchronization and message signals are combined by first sampling the synchronization signal at 16,384 uniformly-spaced points corresponding to the 128×128 message signal array. At each location a weighted sum is formed between the synchronization signal value (which may be a floating-point number ranging between −1 and +1) and the chip value (−1 or +1) at each point. An 8:1 weighting is exemplary, with the synchronization signal dominating. The resultant weighted sum can be scaled, e.g., to a range of −1 to +1, and forms the continuous tone watermark signal. (The signal is termed "continuous tone" since it is based on a floating-point range of values. However, in some embodiments the signal may be quantized, e.g., to 8-bit greyscale values centered at 128.) More generally, a continuous-tone watermark signal is one in which waxel values are not simply binary; there are one or more intermediate values between the highest and lowest waxel values.

From such a continuous tone watermark signal, or its two original components, a corresponding binary watermark pattern can be derived by various techniques, as detailed in U.S. publication 20190332840.

One technique is simply to apply a thresholding operation, identifying the locations in the continuous tone watermark having the lowest (darkest) values (i.e., the most-negative, in the case of values between −1 and +1, or the values closest to zero in an 8-bit greyscale representation). Each such low-valued location is binarily marked, e.g., with a dark mark. Other locations are left unmarked (e.g., with the opposite binary state, such as white). By varying the threshold, the binary watermark pattern can be made darker or lighter (i.e., by increasing or decreasing the number of marks). Such a watermark pattern may be termed a simply-thresholded binary watermark.

A second technique starts with the two separate 128×128 inputs. One is a synchronization signal block, with floating point values between −1 and +1, sampled at a 128×128 array of points. The other is the 128×128 array of payload chip values, having values of black and white (i.e., −1 and +1, or 0 and +1). The darkest (most negative) "x"% of the synchronization signal locations are identified, and binarily marked (e.g., set to black); the others are set to the opposite binary state (e.g., white). Spatially-corresponding elements of the two blocks are ANDed together to find coincidences of black elements between the two blocks. Marks (e.g., dark marks) are formed in an output block at these locations of black coincidence; the other locations in the 128×128 array are left unmarked (e.g., white). By setting the value "x" higher or lower, the output signal block can be made darker or lighter. Such a code may be termed an ANDed, or a Type 1, binary watermark.

Another binary marking technique samples the 2D synchronization signal not in a 128×128 array, but at a higher resolution—such as a resolution at which the pattern will ultimately be rendered. For example, if the pattern will be rendered to span a square that is 1.1 inches on a side, with a rendering resolution of 1200 ppi, then the synchronization signal is sampled in a 1320×1320 array. The 128×128 array of −1/+1 payload chip values is also processed to match this 1320×1320 array size, e.g., using bilinear interpolation, which results in conversion of the binary chip values to floating point values between −1 and +1. These two components are weighted (as above) and summed. The N locations having the lowest values, within the summed 1320×1320 array, are identified for marking. (The location values may be thresholded to identify which should be marked. Alternatively, locations may be chosen in order, lowest-first, until a desired number of locations have been identified for marking.) Such a code may be termed an interpolated, or a Type 2, binary watermark.

Yet another binary marking technique sorts samples within a 128×128 array of synchronization signal samples by value (darkness), yielding a ranked list of the darkest N locations (e.g., 1600 locations), each with a location within the 128×128 array. The darkest of these N locations may be always-marked in an output block (e.g., 400 locations, or P locations), to ensure the synchronization signal is strongly expressed. The others of the N locations (i.e., N-P, or Q locations) are marked, or not, depending on values of message signal data (chips) that are mapped to such locations (e.g., by a scatter table in the encoder). Locations in the sparse block that are not among the N darkest locations (i.e., neither among the P or Q locations) are not selected for marking (although they may be traversed by an energized laser), and they are consequently affirmatively ignored by the decoder. By setting the number N larger or smaller, sparse marks with more or fewer dots are produced. This embodiment may also be termed a Type 3 binary watermark.

These and other techniques are further detailed in U.S. publication 20190332840.

It will be recognized that the greater the number of locations selected for marking, the more faithfully the binary watermark signal will mimic, or approximate, the corresponding continuous tone watermark signal to which it corresponds. But there is a point of diminishing returns, and selection of additional points eventually becomes a hindrance rather than a help (e.g., as the entire area of the watermark becomes flooded with adjoining marks).

We sometimes refer to "dot density" of a binary mark to indicate the relative darkness of the marking pattern. In an array of 128×128 locations (corresponding to the 16,384 binary chip values) up to about 8,192 locations might be marked with dots (marks). We term this a dot density of 100, i.e., 100% of candidate dot locations are marked. A dot density of 20 indicates 20% of 8,192 locations are marked, or about 1600 marks. Dot densities of between about 2 and 30 are most commonly used (as a compromise between visibility and signal robustness), which correspond to between about 150 and 2500 marks in a single watermark block. (Such blocks may be tiled edge-to-edge to span an area of arbitrary size.)

Robustness of watermark patterns, like those just-described, can be assessed by adding increasing levels of Gaussian noise to imagery depicting a watermark pattern, to determine the noise level at which correct payload decoding falls below 50%. The larger this noise level at which the payload can still be correctly decoded 50% of the time, the more robust is the watermark pattern. Such assessments are performed over dozens or hundreds of trials, and averaged, to yield a reliable metric. See, e.g., U.S. Pat. No. 10,217,182.

Figure 2:
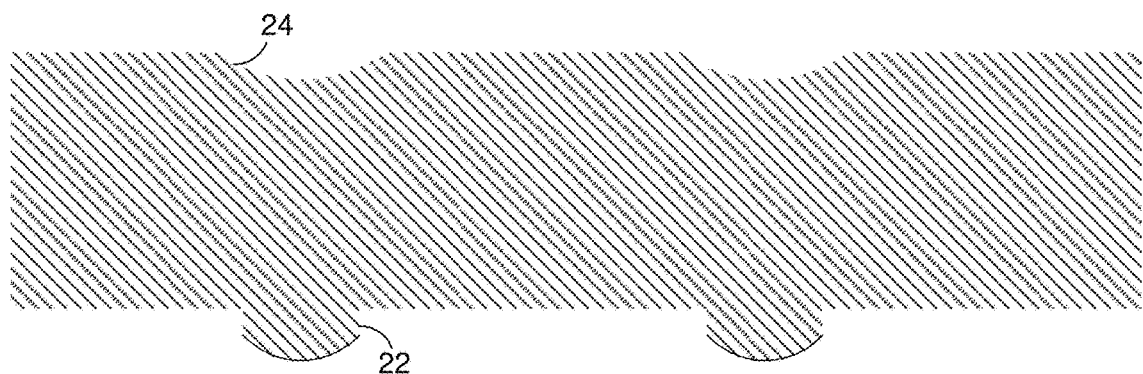
FIG. 2 shows a desired configuration of a resin sheet.

Returning to thermoforming, it is often desirable for molded plastic protrusions resulting from the molding process to have smooth, generally hemispherical shapes, as shown by protrusions 22 in FIG. 2. Each would cause illumination from an incident a light source to reflect in different directions from different parts of the smooth, hemispherical surface. Imagery could then be captured depicting such reflections, and decoded to extract the code corresponding to the original pattern of holes in the mold.

It is also desirable for such protrusions 22 to be mirrored by reciprocal depressions (recesses) 24 on the opposite side of the shaped resin sheet, so that imagery of the opposite side of the sheet could be similarly-processed.

In an illustrative embodiment the holes in the mold surface are cavities of square or round cross-section, having a depth of about 0.3 or 0.5 mm (0.012 or 0.02 inches). Each cavity may be, e.g., 0.15 or 0.2 mm (0.006 or 0.0079 inches) in width. The sheet of plastic being thermoformed may be an opaque (e.g., black) PET resin that is, e.g., 0.2 or 0.4 mm in thickness (0.0079 or 0.016 inches).

As noted, prior art methods of forming watermarks in plastic have suffered from inadequate definition of the very small elemental features that characterize most watermark patterns.

Two phenomena are believed to contribute to such lack of feature definition in the prior art. One is that, when the sheet of resin being thermoformed is urged against the mold, this action traps air in each cavity. The greater the mold pressure, the greater the force exerted against the hot resin by the trapped air. The location where this counteracting force has its greatest effect is along the central vertical axis of the void—tending to push a dimple into the surface of the advancing resin—counteracting the desired hemispherical shape. (This force has a lesser effect up and towards the sides, since the side wall of the cavity limits any lateral displacement of resin.)

The second factor is the viscosity of the resin sheet itself. Although heating of the resin softens it and allows some movement, it is not heated to a molten state (in which the liquid would freely run vertically down into the cavity). Rather it is softened to the point that the resin sheet viscoelastically stretches in response to the applied pressure. Some of the resin moves down under this force into the void from directly above (leading to a depression on the opposite side of the sheet). Other resin enters the void from the sides—seeking relief from the applied pressure. The material approaching from the sides is moving mostly laterally, towards the void's central vertical axis, and when it crosses the lip, such material does not immediately make a 90 degree turn downwardly due to its viscosity. But it eventually is driven downwards, and the lip forms a fixed constraint that leaves a lasting artifact in the molded surface. Indeed, this artifact is commonly the only feature that repeatedly results from the previous watermark formation process. It shows up as a circular ring divot, shaped by the right-angled perimeter of the cavity.

Figure 3:
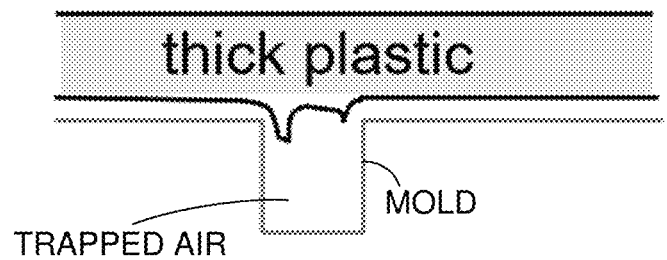
FIG. 3 illustrates a result produced by certain previous thermoforming processes.

Stress gradients created during this molding process tend to cause both the ring divot, and the shape of the protrusion surface, to be irregular. FIG. 3 shows a rough cross-section.

Figure 4:
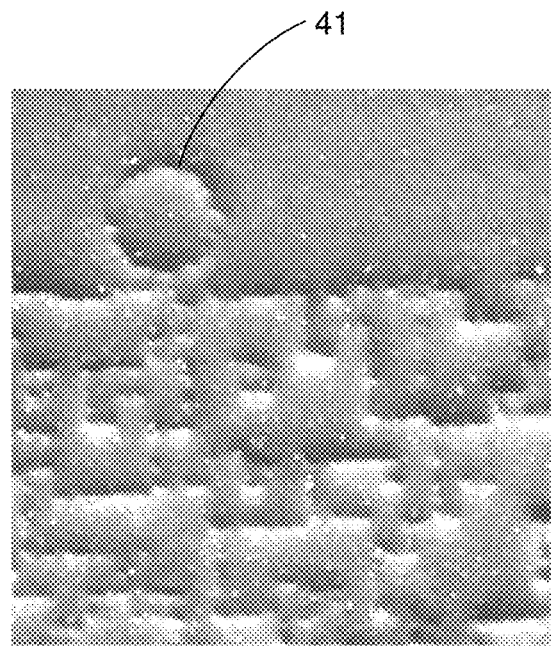
FIG. 4 is an enlarged photograph of a pattern produced by a previous thermoforming process.

FIG. 4 is a microscopic view showing a ring divot 41 produced on a PET item from a much larger mold void (about 0.53 mm across). Below it are shown features resulting from a pattern of square voids of watermark scale. In both cases, the dominant features are not well-shaped hemispherical protrusions, but rather are divots from edges where the resin was stretched over the corner openings into the voids.

One approach to better feature definition is to increase the depth of the cavities. By increasing the volume of the cavities, the plastic-distorting influence of trapped, compressed air is diminished. Ideally each cavity would extend through the mold, so no air is trapped. Alternatively, the cavities are increased to double or more their presently-typical 0.3-0.5 mm depth.

Figure 5:
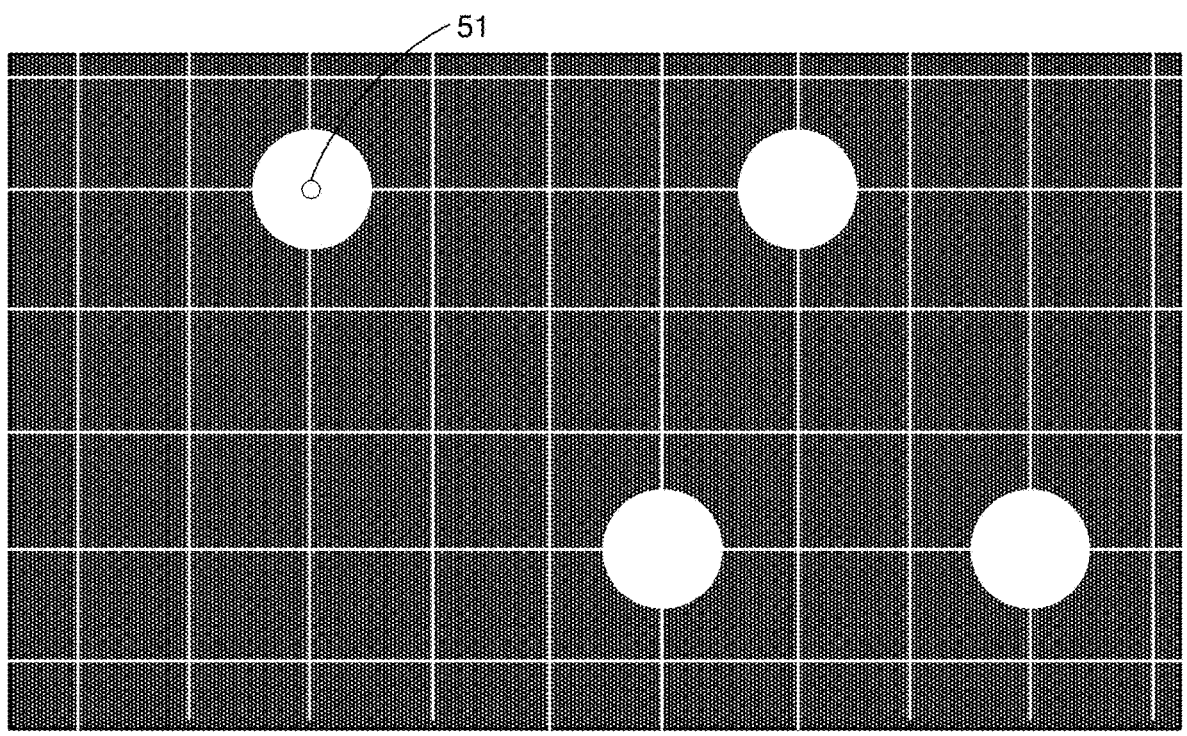
FIG. 5 shows an array of thin channels that allow plural mold voids to vent through a shared vent hole.

Another approach is to form the surface of the mold with a regular or random web of fine vent channels that interconnect the cavities. One of more of the linked cavities is vented to ambient atmospheric pressure, through a passageway that leads to another surface of the mold, which is exposed to the ambient atmospheric pressure. The channels serve as conduits through which air can escape from the unvented cavities through the vented cavity, reducing distortion of the molded surface due to trapped air. The channels are too narrow to be blocked by entrance of the thermoplastic resin under molding pressure. Such arrangement is shown in FIG. 5, with the 2D grid of white lines indicating the fine channels connecting the cavities. The cavity in the upper left includes a vent hole 51 that serves, by the network of channels, to vent the linked cavities. In an illustrative embodiment, between 0.1% and 5% of the cavities are directly vented, with some or all of the other cavities being indirectly vented using such a channel arrangement.

A related approach is to shape the mold surface with other features that define recesses too small to be completely blocked by entry of the thermoplastic resin, yet which collectively allow the passage of air through the texturing, between the hot resin and the metal mold. Sandblasting and scribing random lines with a diamond scribe are two such approaches.

Figure 6:
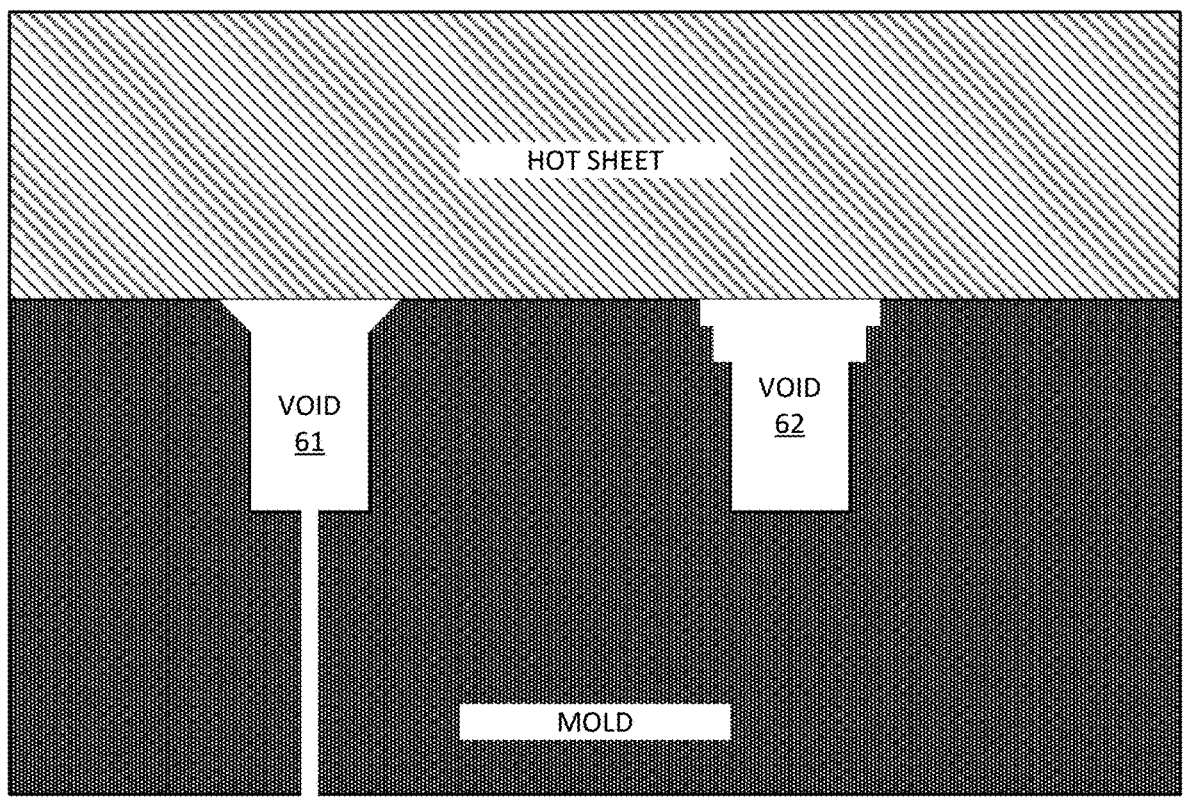
FIG. 6 shows two variant entrances to the mold voids of FIG. 1.

Another approach to improving feature definition is to taper the entrance to the cavity so that it does not present a right-angled edge. This may be done in various manners. One is to vary the focus of a laser beam used in forming a cavity, e.g., starting with a broader spot (say of 0.3 mm in width), and then narrowing to a final spot dimension (say of 0.15 mm in width). During the transition a taper is formed in the opening, as shown by cavity 61 in FIG. 6. (This cavity is shown with a vent leading through the mold. The vent hole may be larger or smaller than illustrated—sometimes up to the dimension of the cavity it vents.)

Another approach is to form multiple stepped cavities, such as an original cavity (e.g., of 0.2 mm diameter and 0.5 mm in depth), and one or more shoulder cavities of larger width (e.g., of 0.25 or 0.3 mm diameter, and 0.1 or 0.2 mm in depth). These are formed concentrically, with the larger, shallower cavities forming a stepped entrance into the deeper cavity, as shown by cavity 62 in FIG. 6.

Naturally, other such configurations can be employed, all serving to facilitate movement of the viscous resin into the cavity.

Yet another approach to better feature definition is to initiate the thermoforming process in a partial vacuum, i.e., in an environment below ambient atmospheric pressure. The more evacuated the better. This reduces the trapped air issue.

Still another approach is to conduct the molding at a higher temperature or pressure than is conventional, to permit the heated plastic to more easily flow into and around the small features defining the machine-readable code pattern cavities. (Conventional thermoforming of PET is commonly conducted at resin temperatures of about 275°-330° C., and at 30-60 PSI pressure.)

In one embodiment, temperatures of 340°, 350°, 375°, 400° C. or even higher may be used. One downside to use of such elevated temperatures is possible clouding of the PET resin. But such consequence matters little with opaque resins.

Another drawback to high temperatures can be the tendency of the resin sheet to adhere to the mold. If this is a concern it can be addressed in various fashions, such as treating the surface of the mold with Teflon or other agent to reduce sticking. Another is to form of the mold of a non-metal material, such as ceramic.

In another embodiment a non-CPET resin sheet is heated conventionally (e.g., by infrared illumination) and is then further heated by a burst of microwave energy, as by a microwave oven magnetron, to effect further softening. If the mold is made of a non-metal material, the sheet can be microwave-irradiated while on the mold, for a fraction (i.e., 1%-25%) of the molding interval, briefly reducing the viscosity of the resin that adjoins the mold to let it more readily flow into the watermark-scale features.

Use of higher temperatures can require different resin chemistry to reduce crystallization, etc., but such resin formulation is within the skill of the artisan.

Another approach to realizing the desired reciprocal protrusion/depression features is to form the protrusions not by mold cavities into which viscous resin is pressurized, but by protrusion or spikes which extend up from the mold surface and intrude into (but not through) and displace the resin sheet above. Such structures can be formed, e.g., by chemically-etching, laser-etching, or otherwise milling away a top surface of the mold, except at locations where the spikes are to remain. By use of molding spikes, the protrusions are not formed on the surface of the resin sheet that is in contact with the mold, but rather on the non-contact surface; the contact surface has spike-formed depressions instead.

The spikes may be of various shapes. Cylinders, cones, cuboids and hemispherical bumps, and combinations of such elements, are exemplary. The shapes are limited primarily by practicality in shaping the mold surface.

Figure 7A:
FIG. 7A is a cross section of a cone-shaped spike.
Figure 8A:
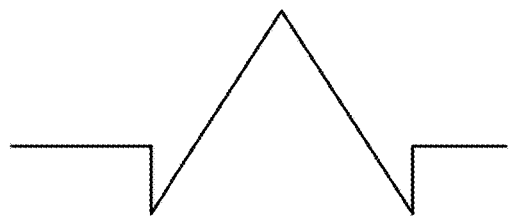
FIG. 8A is a cross section of a cone-shaped spike with a moat.
Figure 8B:
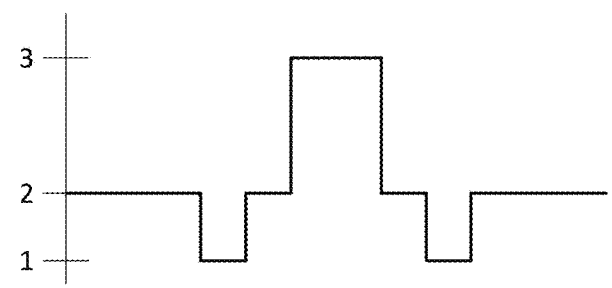
FIG. 8B is a cross-section of an approximation of the FIG. 8A spike that may be realized by selectively milling the mold to assume one of three different levels.
Figure 8C:
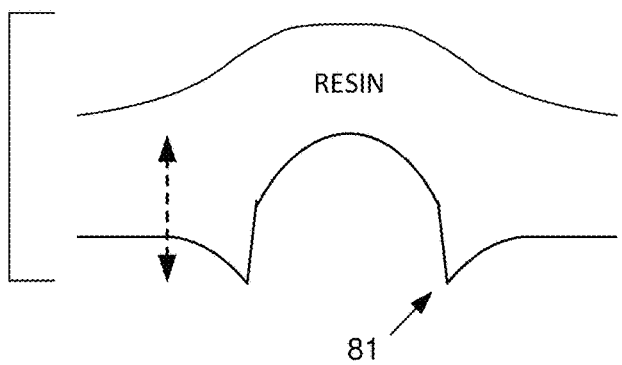
FIG. 8C illustrates how the mold of FIG. 8B can shape a sheet of resin to include a downwardly-protruding lip or ring, which accentuates a height of a recess formed by the FIG. 8B spike.
Figure 8D:
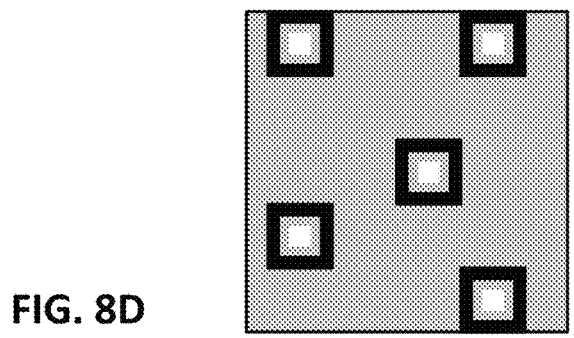
FIG. 8D is an illustration of a ternary digital artwork file that indicates, by different values (colors), the different elevations to which the mold surface is to be milled.
Figure 9A:
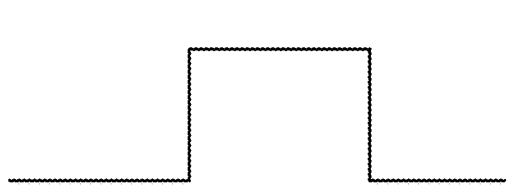
FIG. 9A is a cross section of a cuboid-shaped spike.
Figure 9B:
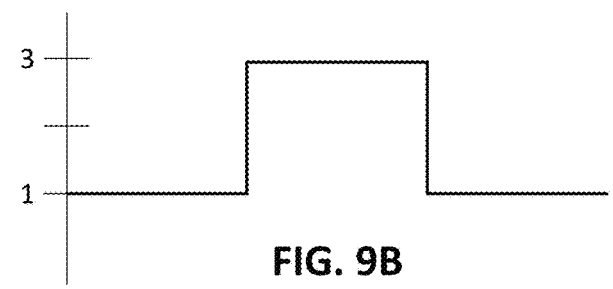
FIG. 9B shows how the FIG. 9A spike can be identically realized by selectively milling the mold to one of two elevations.
Figure 10A:
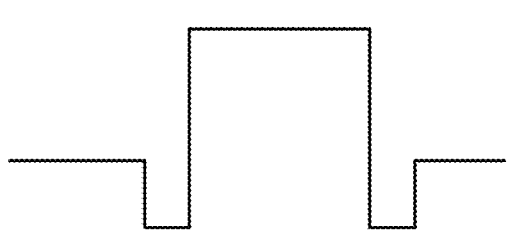
FIG. 10A is a cross section of a cuboid-shaped spike with a moat.

FIGS. 7A-10A show cross-sections through certain idealized spike arrangements. FIG. 7A shows a low cone; FIG. 8A shows a mid cone with an adjoining or surrounding moat; FIG. 9A shows a low step; and FIG. 10A shows a mid step, including a moat.

FIGS. 7B-10B show practical instantiations of the spikes of FIGS. 7A-10A, respectively, which can be fabricated using tooling that removes metal from the mold surface to two different depths (i.e., three levels in all, when including the mold surface without milling).

Figure 7B:
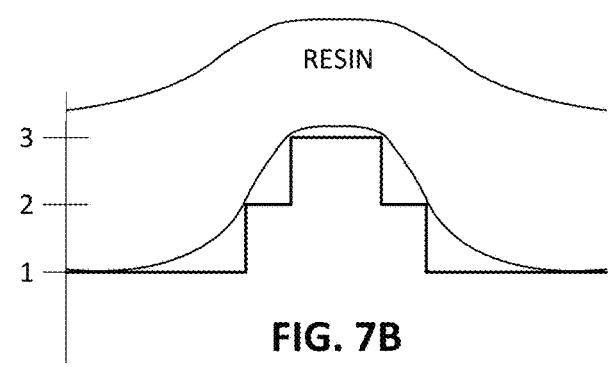
FIG. 7B is a cross-section of an approximation of the FIG. 7A spike that may be realized by selectively milling the mold to assume one of three different levels, together with a shaped sheet of resin on top of the mold.

FIG. 7B shows that a cone spike can be approximated as a stepped series of flats. A shaped sheet of plastic is also shown, as it may be shaped by such a feature. A recess is formed in the side of the sheet that is in contact with the mold, with width and height (depth) dimensions corresponding to those of the spike feature. A corresponding protrusion extends from the opposite surface—the surface that is not in contact with the mold. Due to the viscoelasticity of the hot resin sheet, this protrusion may be someone lesser in height, and greater in width, than the top of spike feature to which it corresponds. But since the top of a cone or tapered spike is smaller than its base, this enlargement in width is, in some measure, accounted for.

In FIG. 7B, the un-milled surface of the mold corresponds to the top of stepped cone—shown by the value '3' on the adjoining scale. The intermediate cone level, and the bottom level, are achieved by removing material from the mold surface. These are indicated by values '2' and '1' on the adjoining scale. Except where there are spikes, the molded resin surface corresponds to the bottom level ('1'). This gives rise to applicant's term "low spike."

A different situation prevails in FIG. 8B. Again, a cone is approximated as a stepped shape. And again, there are three levels in all, with the unmilled top surface ('3') corresponding to the top of the stepped cone. But here, except where there are spikes, the molded resin surface corresponds to the intermediate level ('2'). The bottom level ('1') is the floor of an adjoining moat that extends below this nominal plastic surface. This gives rise to applicant's term "mid spike."

With sufficient pressure, some of the viscous sheet is forced down into the moat. This forms a ring or lip 81 on the bottom of the shaped PET, as depicted in the cross-sectional view of FIG. 8C, showing an excerpted view of the shaped resin sheet. This ring has the effect of effectively increasing the vertical rise of the recess (shown by the dashed line in FIG. 8C), without increasing the risk of a puncture through the sheet. Unlike the ring divot shown in FIG. 4, this ring forms a crest of material that extends out from the plastic surface. The crest's extension from the surface, however, is modest compared to the effective vertical rise of the recess—typically a third or less, and more commonly a quarter or less.

The mold of FIG. 1 can be defined by an artwork file comprising an array of binary values, each corresponding to a location on the mold surface and specifying its finished depth. A "0" can indicate the mold surface is to be unchanged, and a "1" can indicate where the mold is to be milled to form a cavity. The mold milling system can use this binary data as a map that controls shaping of the mold. (In some embodiments the artwork file is expanded to three states, enabling identification of the vent locations, with the three states respectively indicating: unchanged, milled with cavity, and milled with cavity and vent.)

Figure 10B:
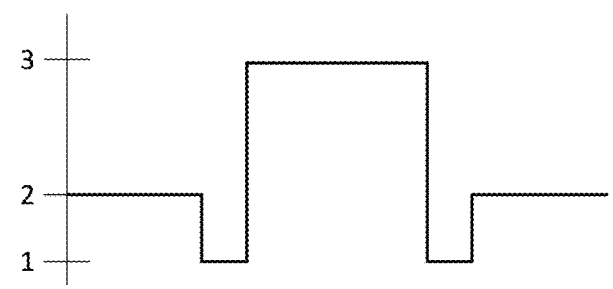
FIG. 10B shows how the FIG. 10A spike can be identically realized by selectively milling the mold to one of three elevations.

The molds of FIGS. 7B, and 8B and 10B, can be defined similarly, but with one more value: three values (e.g., 1, 2 and 3) instead of two (e.g., 0 and 1). These values are shown at the left edges of the figures.

FIG. 8D is a graphical rendering of an excerpt of such an artwork file that includes several spikes like that of FIG. 8B, where black denotes level '1' (corresponding to the bottom of the moat), grey denotes level '2' (corresponding to the nominal surface of the sheet), and white denotes level '3' (indicating the top of the spike, and the original surface of the mold surface before milling).

FIGS. 9A and 10A show a different form of spike—a cuboid instead of a cone. FIG. 10A includes a moat to allow formation of a ring, as discussed above. FIGS. 9B and 10B show corresponding shapes as they may be specified by ternary data to a milling machine. In this case no approximation is used—the cuboids are rendered in their ideal form.

Vents were discussed above in connection with mold cavities. It will be recognized that the just-discussed moats are, themselves, cavities. The use of venting facilitates resin displacement into such features. Additionally, as a hot resin sheet is pressed against a mold having spike features, air becomes entrapped between the mold and the sheet, around the spikes. Permitting this air to escape through vents helps avoid irregularities in the finished, molded surface.

Figure 11:
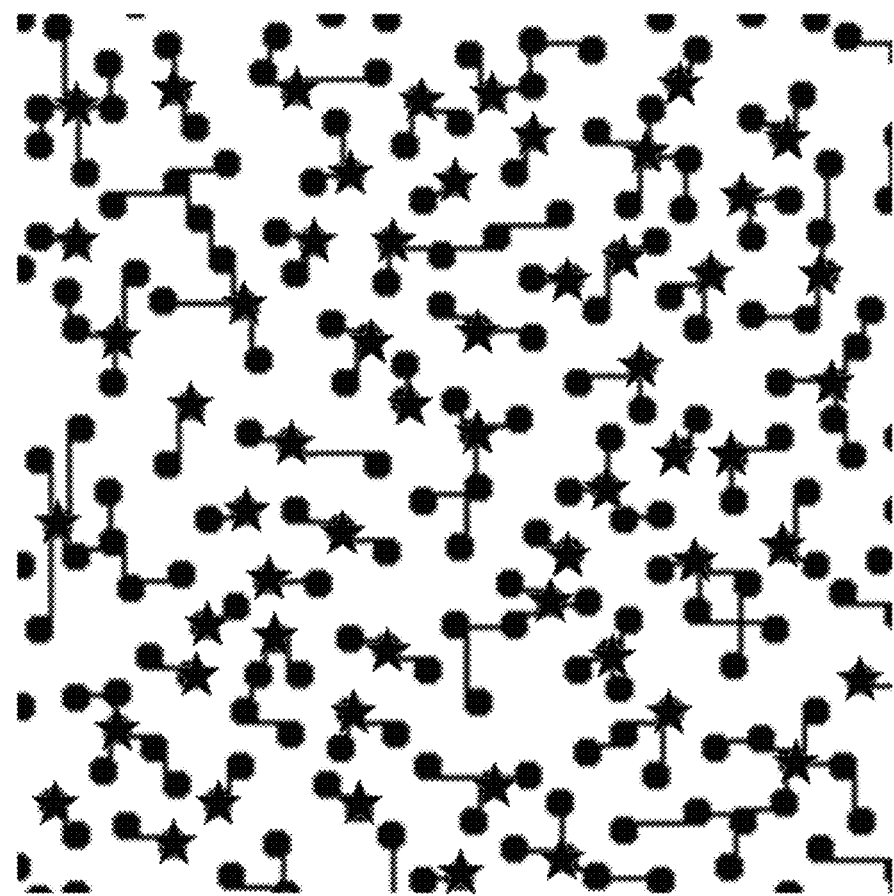
FIG. 11 is a map template showing locations of spikes, air channels linking the spikes, and star-indicated vent holes, in an illustrative arrangement.

Again, desirably, all of the moats are directly vented. But as an alternative, channels may link groups of moats together to share a vent formed in only one of them. FIG. 11 is a milling map that shows air lines connecting certain of the moats. These lines can be realized as channels having the same depth as the moats (i.e., at level '1' in FIGS. 8B and 10B), and a narrow width, e.g., of 0.04 mm, to assure passage of air even under molding pressure and intrusion of some resin. The spikes with vented moats are indicated by stars.

Figure 12:
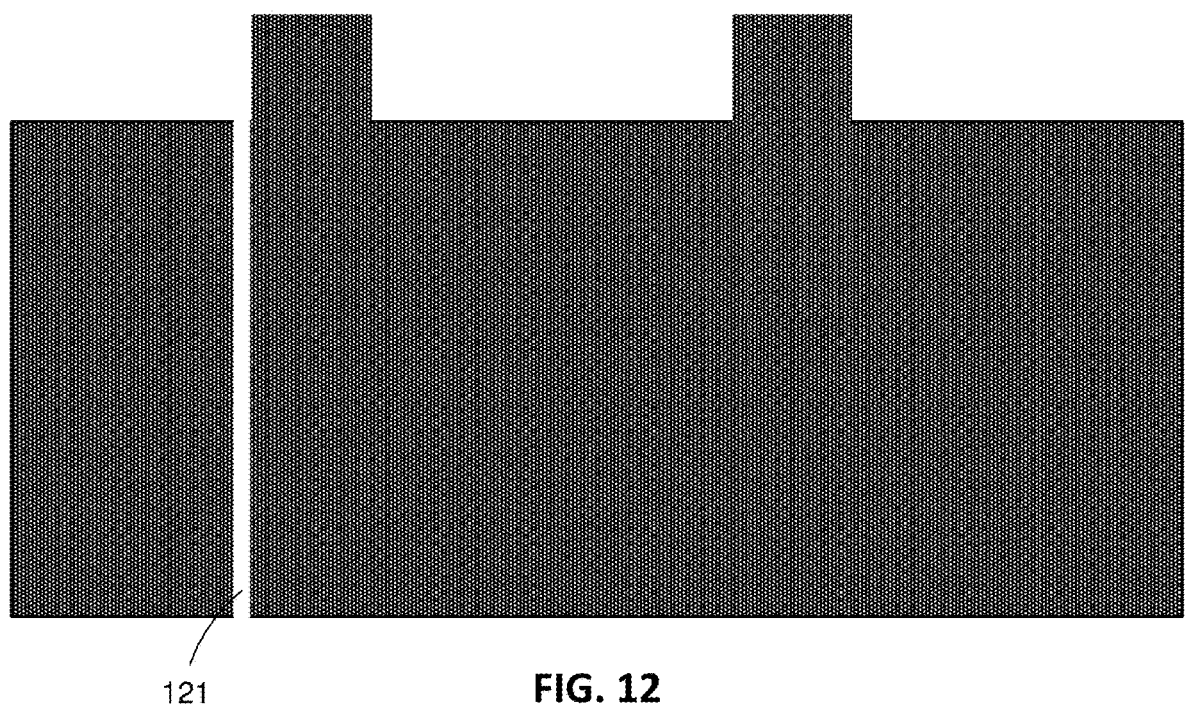
FIG. 12 shows a mold with spike protrusions, one of which has an adjoining vent hole.

Venting can be employed even in embodiments, like FIG. 9B, that do not include moats. Thru-holes can be formed adjacent some or all of the spikes, as shown by vent hole 121 in FIG. 12. The surface of the mold can be shaped, e.g., by random lines formed by a diamond scribe or by sandblasting, to provide paths for air travel from spikes to vent holes.

In an illustrative mold, two-thirds or more of the original material surface may be milled away, leaving a third or less of the original surface area to define the spikes. Collectively, moats span a small fraction, such as less than 10% or 3%, of the milled surface.

Other aspects discussed in connection with cavities apply likewise to spike-based arrangements, such as initiating molding at a partial vacuum.

The use of three levels in the molds of FIGS. 7B, 8B and 10B is exemplary but not limiting. Four or more levels can naturally be used—each indicating a different height (elevation) of the finished mold. The greater the number of levels, the higher resolution the features. For example, U- and V-shaped cavities may be approximated with successively more precision by increasing the number of levels used. Some embodiments create features with surfaces that are defined with near-continuous precision, e.g., with mold elevation being defined by 8-bit data. (There is no requirement that the different surface elevations be uniformly spaced from each other; their spacings can be different, as shown in FIG. 10B.)

Similarly, while the map of FIG. 8D indicates a raster-based shaping of the mold, in other arrangements a vector arrangement can be employed.

Still another approach to achieving better feature definition is to employ a molding surface on both sides of the thermoplastic sheet, such as by employing so-called plug-assist molding. In such case, both of the surfaces of the resin sheet are shaped to impart the desired 2D pattern—one mold imparts a pattern of protrusions and the other mold imparts a reciprocal pattern of depressions. The protrusions and depressions can be fashioned as above.

In still other arrangements watermark features are formed on both sides of the plastic sheet before thermoforming. These may be printed or shaped features. The ensuing thermoforming process diminishes the strength of shaped features, but the thermoforming parameters (e.g., temperature and pressure) can be set so that adequate feature strength persists through such processing. (Printed features generally persist through thermoforming with only some spatial deformation. If desired, the printed pattern can be pre-warped in anticipation of the expected spatial deformation. Watermark detectors are robust to minor spatial deformations.)

Still another arrangement for enhancing feature definition is to apply pulses of molding pressure that exceed the normal, e.g., 30-60 PSI molding pressure. Hammer-like pressure impulses lasting for tens or hundreds of milliseconds, at pressures of 75 PSI, 100 PSI, 150 PSI, 250 PSI or even more, can help agitate the viscous resin into the watermark-scale mold features. (A hydraulic hammer arrangement can be used. A hydraulic cylinder is pressurized with air, which is then released as a pressure burst into the molding chamber by a valve that periodically opens and closes a linking hose. A pressure regulator releases the excess pressure from the mold chamber after a brief interval.)

Relatedly, the mold can be vibrated at frequencies in the tens of Hz, up into the tens of KHz, again helping physically agitate the resin into the watermark-scale mold features. Vibration motors are commonly available, e.g., from Tinsley Equipment Co., and often employ an eccentrically-mounted weight on a rotating shaft.

After release from the mold, the shaped item may be transported past an electric or IR heating element, at a distance and speed, that prevent the large scale shape of the item from changing. But the surfaces of small scale features, like watermark protrusions are quickly re-heated to a viscous—and sometimes liquid state, in which they may flow to a more regular configuration before the resin cools again to its glass state. Such post-processing can help accentuate rounding and smoothing of watermark-scale features.

Naturally, combinations of such arrangements with each other—and with the arrangements detailed in the cited patent documents—provide greater benefits than such arrangements used in isolation.

By use of the arrangements detailed herein, an elemental feature having a width dimension of 0.169 mm can be formed in a black-colored PET sheet of 0.2 mm thickness and be optically detectable from both sides of the sheet. Such markings can collectively be arrayed to define a 2D binary watermark pattern that is decodable from both sides of the sheet. In certain of the arrangements, such features can be formed in an APET sheet of 0.4 mm thickness and be similarly optically detectable, and yield a binary watermark pattern that is similarly decodable. This is a notable enhancement compared to existing processes, in which such results cannot all be achieved.

(As is familiar to artisans, some element of trial and error is required when tailoring thermoforming to a particular set of application requirements. But by adoption of one or more of the techniques detailed herein, experimentation will lead to a satisfactory solution.)

FURTHER DISCLOSURE

As just detailed, texture on a molded plastic item can be defined by indented features in the associated mold, such as pits or holes or channels that extend into the mold surface. (This is sometimes termed an embossed mold.) Alternatively, or additionally, the texture can be defined by features that protrude up from the mold surface. (This is sometimes termed a debossed mold.) The former yields a plastic surface having bumps or ridges where the plastic has been urged into the mold indentations. The latter yields a plastic surface having divots or channels where the plastic has been displaced by the protruding mold features.

Defining the size and placement of mold features implicates a variety of conflicting considerations. One consideration is the number of features that are formed. Generally, the more features, the more signal. More signal helps readability in adverse conditions, such as when a textured plastic bottle is read in a recycling facility in the presence of soiling, partial occlusion, glare, etc.

However, increased feature count generally requires smaller features.

Small features are disadvantageous in multiple respects. For example, small features can be difficult to machine. Drilling holes in a mold surface, for example, becomes impractical for features smaller than a certain size. And drilling holes closer together than a threshold distance (i.e., 0.01 inch) is commonly impractical. Still further, the viscosity and surface tension of thermoplastic resin causes it to resist flowing into small holes—even under pressurization. Small protrusions, if successfully machined, are mechanically frail, limiting the useful lives of molds formed with such features.

In accordance with a further aspect of the present technology, high resolution features are assembled in proximity to achieve larger-scale holes or protrusions. The high resolution enables more information to be conveyed. Assembling such features in proximity yields connected structures that reduce the manufacturing and durability concerns normally associated with small features.

In some embodiments employ this aspect of the technology, dilation and erosion are applied successively to transform a feature pattern into one that is more suitable for molding plastic.

It is helpful to again quickly review certain pertinent aspects of watermark technology, and establish certain variables, before proceeding further.

In an illustrative embodiment, a 2D binary signal pattern is a square block (sometimes termed a tile) that can be tiled edge-to-edge with other such blocks to span an arbitrary area. Each block represents two signal components: a reference signal and a payload signal. The reference signal can comprise dozens of 2D sinusoids of different spatial frequencies and phases, summed together. The payload signal can comprise a 2D array of size, e.g., 128×128, each element of which has a bitonal value representing a "0" or "1" value.

Prior art watermark references cited herein teach various methods of deriving a 2D binary signal code from a 2D continuous-tone signal pattern (sometimes termed a composite, or a dense, signal pattern). One such method employs two variables, which are set to desired values. The first is a resolution at which the data elements are to be rendered, in elements per inch. Since each payload element is commonly termed a waxel, this first variable is expressed in waxels per inch, or WPI. The larger this number, the smaller is each element. A value of 150 WPI is exemplary. The second variable is a resolution of the coordinate space in which the signal pattern will be rendered. 600 dots per inch (DPI, aka pixels per inch) is exemplary. The ratio of these values, DPI/WPI (4 in this example) expresses the size of each waxel in the rendering coordinate space (i.e., 4×4 rendering elements, or pixels). Since the payload is an array of 128×128 elements (waxels), the size of a single block in the rendering space is K×K, where K=128*DPI/WPI, or 512×512. Since each element in the rendering space is $1/600^{th}$ inch, the final block will be K/600 or 0.853 inches on a side.

To create the continuous-tone signal pattern block, the reference signal can be sampled to yield a K×K (512×512) element array of floating-point values, corresponding to a block 0.853 inches on a side. The 128×128 payload array is upsampled (e.g., using bilinear interpolation) to also yield a K×K (512×512) element array. In so-doing the payload array is transformed from binary (bitonal) to non-binary, e.g., floating point. Values for spatially-corresponding elements of the reference signal and the interpolated payload signal are summed in a predetermined weighting, yielding a K×K (512×512) element continuous-tone signal pattern. (Such method was referenced earlier as a Type 2 binary watermark.) Values of the elements may be scaled as desired. They may range, e.g., from −1 to +1, or 0 to 255, etc.

(The number of waxels in the array comprising the watermark pattern block, e.g., 128^2 or 16,384 in this example, can be represented by the variable "X." The number of pixels, or dots, in the array, i.e., 512^2 or 262,144 in this example, can be represented by the variable "Y.")

Figure 14:
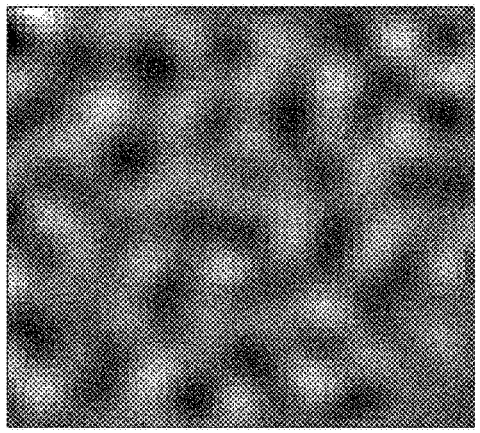
FIG. 14 shows reference and interpolated payload component signal blocks combined in a weighted sum to yield a continuous-tone signal block.
Figure 14:
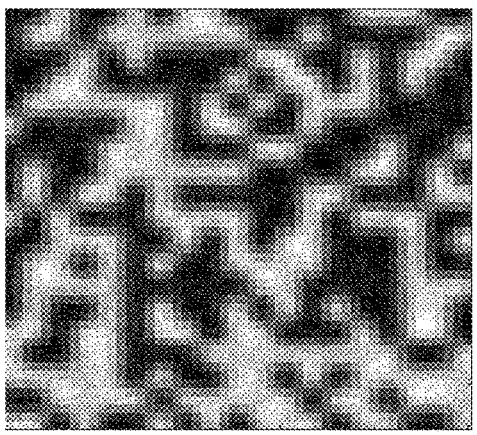
Figure 14:
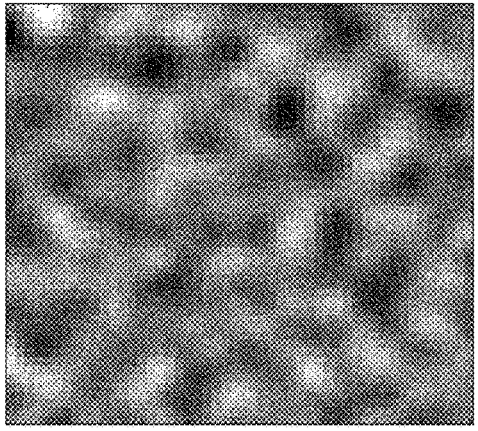

Aspects of the just-described method are shown in FIG. 14. A reference signal component is sampled to yield a K×K array 141. A binary payload signal component is interpolated, yielding a non-binary counterpart 142 at this same size. These two components are summed in a weighted relationship (here 1:0.1253) to yield a composite, or continuous-tone K×K signal pattern 144.

A pattern generated by this method may be termed an interpolated, continuous-tone signal pattern. Other methods for generating continuous-tone signal patterns are known and can alternatively be used.

One way to generate a binary pattern from such a continuous tone signal pattern (e.g., for use in shaping a mold) is to examine the values comprising the signal pattern to identify the most-extreme values, i.e., the largest, or the smallest, or the most-negative, depending on implementation. A suitable examination technique is to threshold all of the values to identify those larger (or smaller) than a given value (e.g., a median value for the continuous tone signal values). This thresholded set is then sorted to establish an ordering of the most extreme values in the continuous signal tile. The first value in this ordered set has the most extreme value, and a mark (e.g., hole) is placed at that corresponding location in an output signal array. The remaining elements in the sorted set are then examined to identify the most-extreme value remaining. Another mark is placed at its location. This process continues until a desired number of marks (holes) have been located.

Typically, once a mark is placed at a location, certain locations around that location are disqualified for other mark locations, to prevent marks from overlapping, and/or to maintain a keep-out zone around each mark. Such disqualification of nearby locations is sometimes termed a mark placement constraint.

Figure 15:
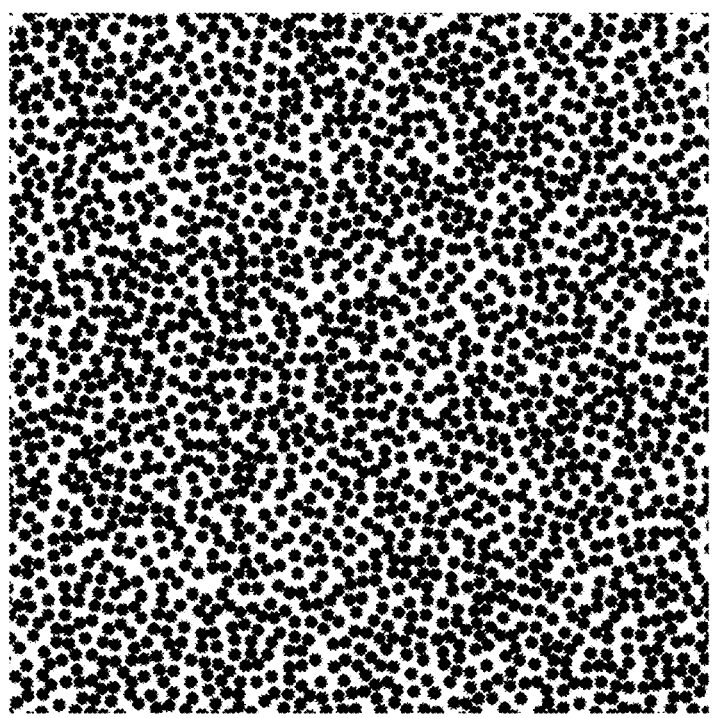
FIG. 15 shows an illustrative binary pattern, with which a mold for a plastic container can be shaped.
Figure 16:
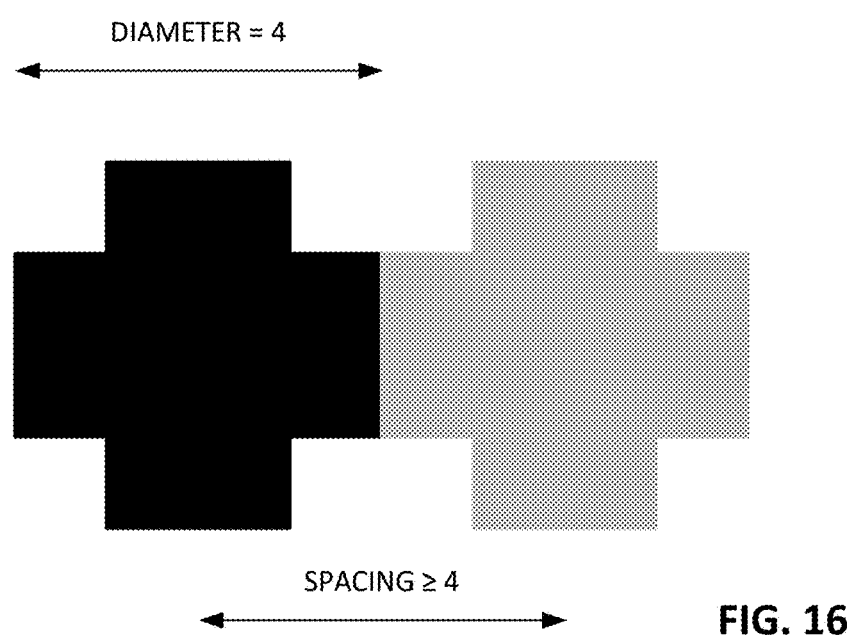
FIG. 16 illustrates two hole patterns, or stamps, adjoining edge-to-edge.

FIG. 15 shows an arrangement resulting from the just-described method. In this example, the continuous-tone signal pattern was defined at 600 dots per inch, i.e., with the locations spaced by 0.001666 inches. The marks occupy an area of 4×4 such locations, so once a location is marked for a hole, the next-nearest mark must be centered at least 4 locations away, as shown in FIG. 16. (In this example, round marks are approximated by a square elements.) As can be seen from FIG. 15, certain marks touch, but due to the mark placement constraint, none overlaps.

Applicant has found the FIG. 15 arrangement to be satisfactory for print applications, but sub-optimal for shaping molds. For example, holes that adjoin (e.g., as in FIG. 16) cannot be manufactured by drilling. Drilling requires that a keep-out zone, e.g., of 0.01 inch, be maintained around each hole. Such keep-out zone limits the number of holes that can be fashioned, which in turn limits signal robustness. Moreover, while smaller features (e.g., holes) are desired to achieve higher resolution signals, smaller holes do not admit viscous hot plastic well. Thus, the fidelity of the shaped plastic, compared to the mold ideal, diminishes with smaller hole sizes. (Still further, the opposite side of the plastic sheet being shaped, i.e., the side not in contact with the mold, is formed with even less fidelity.)

Applicant has discovered that an improved arrangement can be transforming a continuous-tone watermark pattern into a binary watermark pattern using overlapping marks (e.g., mold holes), yielding what applicant terms a connected binary mark. While a second hole cannot be drilled closer than a threshold distance from a first hole, applicant has found that a first mold hole can be enlarged, e.g., using a router bit or electrical discharge machining, to extend a hole in a desired direction. However, this is best done with some nuance, rather than by simply applying the above-described method without any hole placement constraint.

An exemplary method first defines a binary template of the hole shape. If the holes are to be round, the approximation of FIG. 17 can be used. This FIG. 17 template, or stamp, spans an area of 7×7 (L×L) elements which, at 600 to the inch, yields an approximation of a circle having a diameter of 0.01166 inches.

A continuous-tone signal pattern block is created, as before. Again, we use as exemplary a 128×128 payload array, to be rendered at 150 WPI, in a coordinate space having a resolution of 600 DPI, yielding an array of 512×512 (K×K) non-binary values. We term this array ContSignalTile.

We define an initially-empty output signal block (i.e., all locations having a first binary value), termed BinSignalTile, the same size as the continuous-tone signal pattern block: 512×512. Before placing each hole, we compute three 512×512 arrays of values that are used, as described below, to decide the location at which the hole (i.e. the FIG. 17 stamp) should be placed. The arrays have values, at coordinate locations i,j, as described below:

In the first array, termed NumMarkedPixels, the value at location i,j is the number of pixels (elements) that would turn black if the stamp is placed (i.e., centered) at that location. Initially, all values in this array have a value of 37—the number of black elements in the stamp. (The 7×7 array includes 12 white elements.) As stamps (holes) are placed in the output signal block, the values in the NumMarkedPixels array at some locations diminish since certain stamp placements will overlap with previously-placed stamps. (At edges of the K×K array we modulo-back to the opposite edge, as if the block were tiled with identical other such blocks.)

In the second array, termed StampScore, the value at location id is the sum of the 49 (i.e., L-squared) values in the continuous-tone signal pattern array ContSignalTile under the black stamp, if the stamp is placed at that location.

In the third array, termed NormalizedStampScore, the value at location i,j is the ratio between spatially-corresponding values in the other two arrays, i.e., StampScore/NumMarkedPixels. (This value is set to zero if NumMarkedPixels for a location is zero.)

The largest value in the third array is identified. Its i,j coordinates indicate the stamp location that will yield the most signal per unit area. The stamp is applied at this location in the output signal block, BinSignalTile, with corresponding elements turned black (i.e., set to a second binary value opposite the first). This operation essentially logically ORs the stamp pattern with the BinSignalTile pattern. The result is stored as the then-Current BinSignalTile pattern. All locations in the continuous-tone signal pattern array ContSignalTile, spatially-corresponding to the just-placed stamp, are then zeroed, to prevent that location from being selected a second time.

The process repeats, with the re-computation of the three just-described arrays, etc., until a number of stamping iterations or other threshold (e.g., a number of marked elements, or a total percentage marking of the output tile) is reached. (Typically, the three arrays are not wholly recomputed; rather, the values at the i,j locations affected by the just-placed stamp are recomputed, thereby updating the arrays.)

Figure 18:
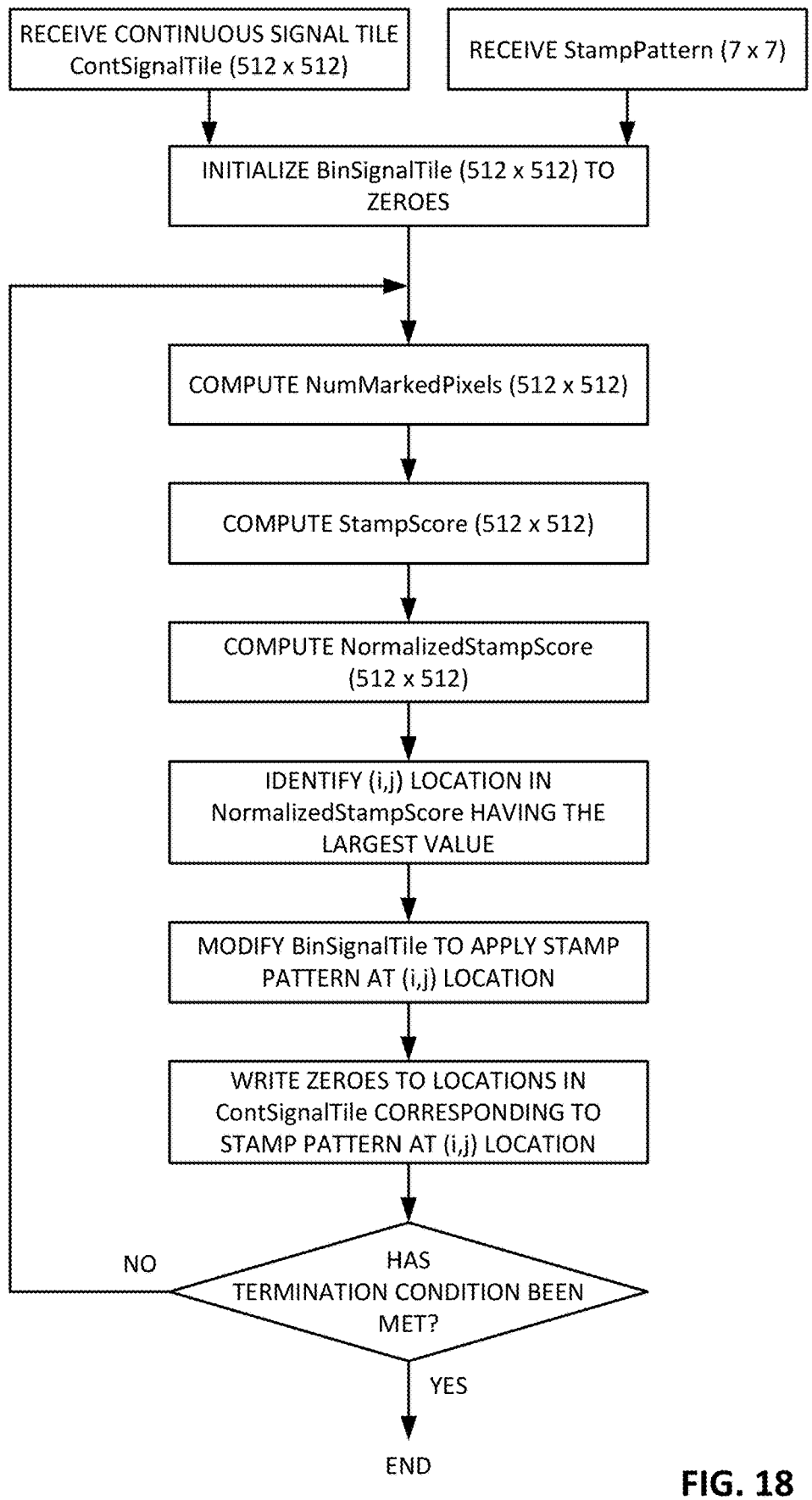
FIGS. 18 and 18A define algorithms for producing a connected binary pattern from a continuous-tone signal block.

Such algorithm is illustrated in FIG. 18.

Figure 18A:
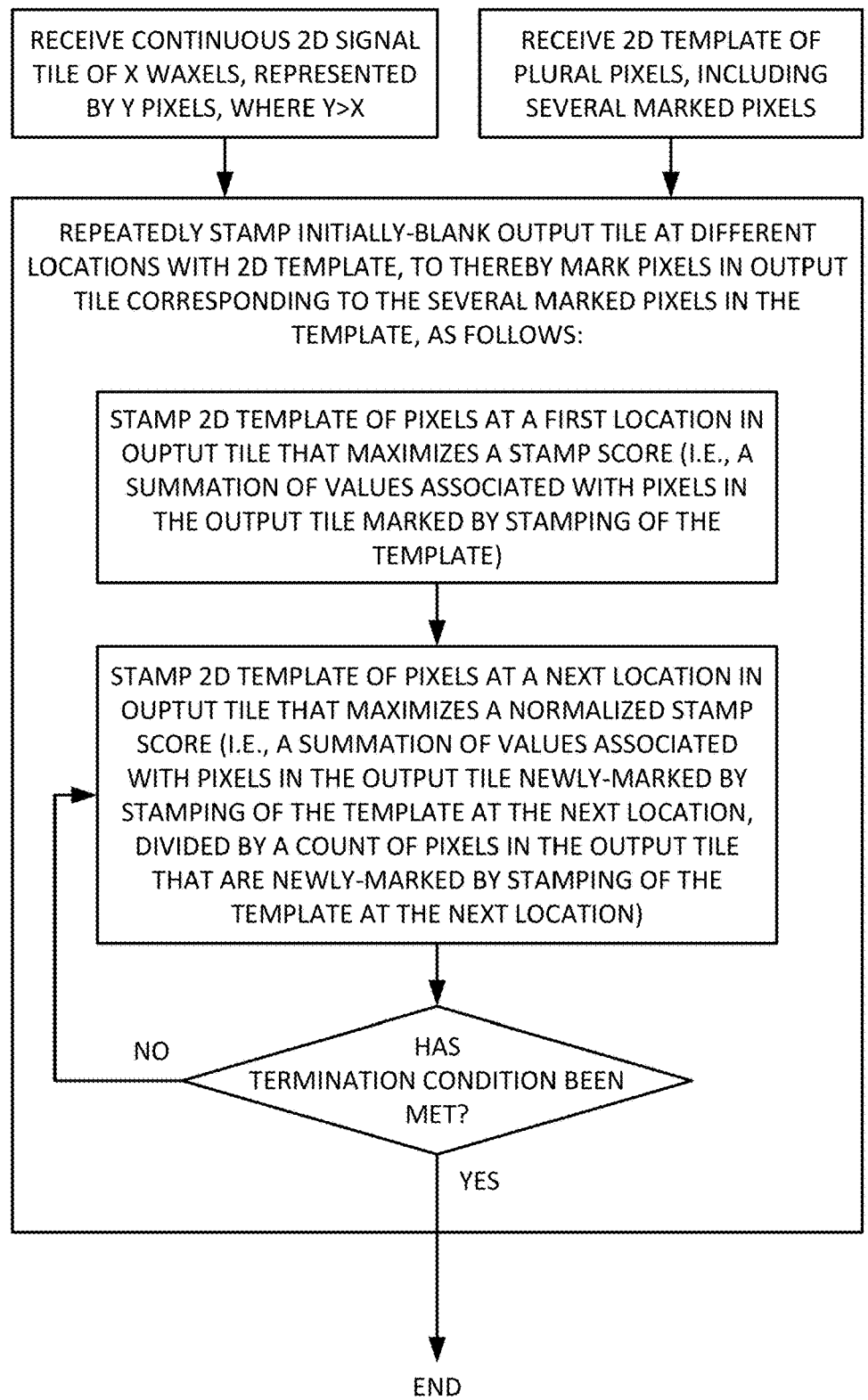

A more general method for marking locations in an initially-unmarked 2D output tile of Y pixels, to approximate a continuous-tone watermark pattern of X pixels (in which each location in the Y pixel output tile is associated with a spatially-corresponding pixel location, and value, of the Y pixel array) is illustrated in FIG. 18A.

Figure 19:
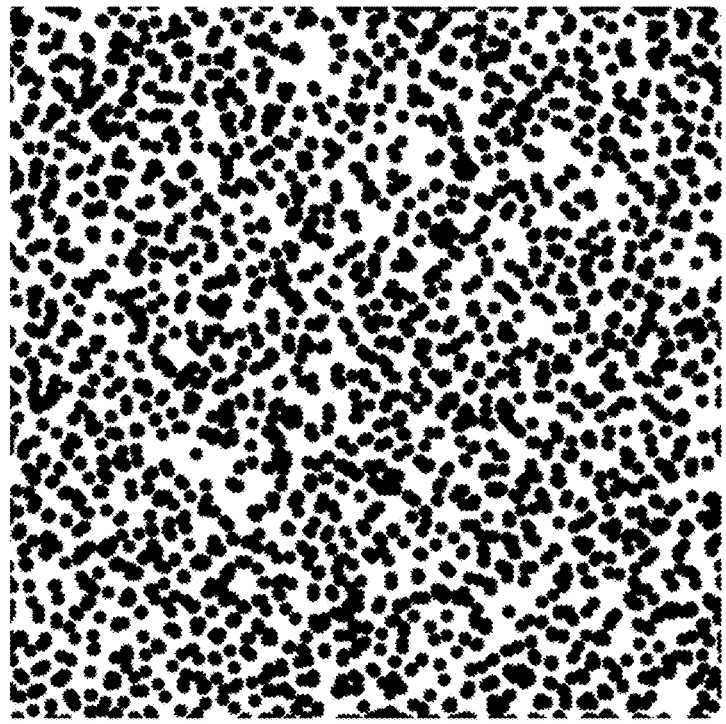
FIG. 19 is a connected binary pattern produced using the algorithm of FIG. 18.

An exemplary application of the algorithms of FIGS. 18 and 18A yields a pattern like that shown in FIG. 19. Holes may overlap, as shown in FIG. 20, unlike in the pattern of FIG. 15.

In comparing the binary signal blocks of FIG. 15 (no overlap) and FIG. 19 (overlap permitted), their respective reference signals are found to have essentially the same robustness, yet the total area in FIG. 19 occupied by holes is actually less (by about 10%) than the area in FIG. 15 occupied by holes. The payload component in the FIG. 19 pattern is more robust than that in FIG. 15, with message scores of 982 vs. 816. (Metrics for computing robustness scores for reference and payload signals are described in our U.S. Pat. Nos. 10,506,128 and 7,286,685.) Due to the overlapping placement of certain holes in FIG. 19, and the physical extension of holes, the voids defined by FIG. 19 are larger, on average, than the holes defined by FIG. 15. This allows viscous hot plastic to more readily enter, yielding better surface definition of the molded plastic.

Figure 20:
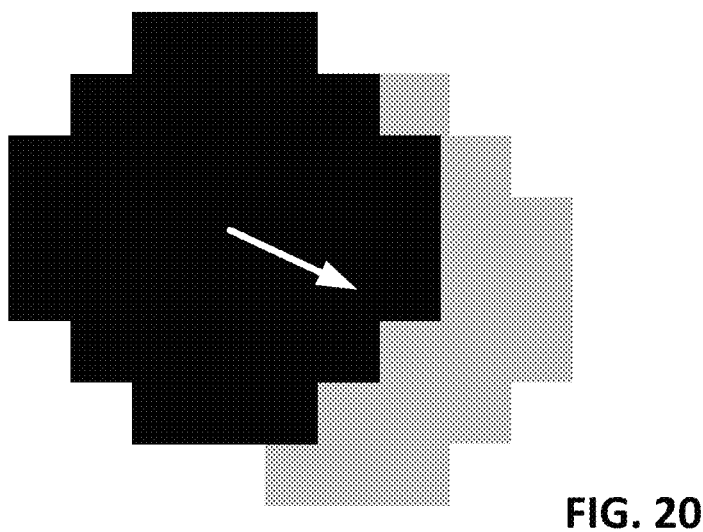
FIG. 20 illustrates how the stamp of FIG. 17 can be applied in two locations in overlapping fashion.

Exemplary overlapping of two holes (stamp patterns), as may arise by application of the FIG. 18 algorithm, is shown in magnified form in FIG. 20. It will be recognized that the combined area of the composite void formed thereby is larger than the area of a single stamp pattern, yet it is not fully twice the area of a single stamp pattern (as is the case when stamps adjoin, as in FIG. 17). That is, the surface area of the composite void of FIG. 20 is a non-integral multiple of the area of the single stamp pattern.

It will further be recognized that the centers of two overlapped stamp patterns may not be simply offset vertically, nor horizontally. Rather, in this example the two centers are offset both vertically and horizontally, by differing distances (i.e., two pixel units to the right and one pixel unit down).

In the example just-given, a waxel occupies a rendering area of 4×4 elements (e.g., dots or pixels). Yet the stamp pattern measures 7×7 elements. Thus, a single stamp pattern spans an area larger than a waxel. In different implementations, a single stamp pattern can be either larger or smaller than a waxel. For example, a single stamp pattern can measure 3, 4, 7 or 10 elements on a side. Moreover, the stamp pattern needn't be symmetrical about two axes. It can be symmetrical about only one axis, or about no axis. The use of marking elements larger than a waxel, and having shapes other than circular, is further detailed in cited U.S. patent application Ser. No. 17/214,455 (issued as U.S. Pat. No. 11,741,733).

A variant of the FIG. 18 algorithm can be employed when designing a mold comprising spikes (i.e., protrusions) rather than holes.

In the FIG. 18 algorithm (designed for holes), a blank binary block initially has no holes. The algorithm repeatedly stamps a hole pattern across the block. At the end, the hole region (i.e., the void region) is the union of all stamped patterns. That is, the region to be removed from the mold material is the hole region.

To apply such algorithm to a pattern of spikes, a blank binary block initially has no spikes. The algorithm repeatedly stamps a spike pattern across the block. At the end, the spike region is the union of all the stamped patterns. The region to be removed from the mold material is the non-spike region.

In a spike-based implementation, a variant of a keep-out constraint may be used.

Figure 17:
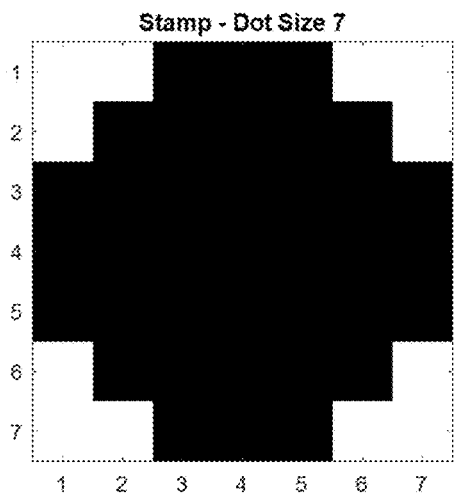
FIG. 17 shows a 7×7 pixel approximation of a circle, which can be used as a stamp pattern.

In greater detail, a method for creating a connected spike pattern starts with a stamp pattern, like FIG. 17. Here we start with an inverted continuous-tone watermark, i.e., the negative of a weighted sum between the reference signal component and the upsampled payload signal component. This again is termed ContSignalTile, which may have dimensions of 512×512. We also again start with an initially empty output array, BinSignalTile, of the same size as ContSignalTile. Other arrays have the same meaning as in FIG. 18.

We now compute an initial array, IsolatedNormalizedStampScore, which is equal to StampScore/NumMarkedPixels (where NumMarkedPixels is numel(stamp), that is, the number of black pixels, or 37 in this case). This gives a figure of merit for each potential stamp location in the 512×512 array, based on the associated locations in the continuous signal tile.

We then compute three 512×512 arrays as before: NumMarkedPixels, StampScore and NormalizedStampScore (now called ConnectedNormalizedStampScore). We then find the maximum value among the 512×512 values in the just-computed ConnectedNormalizedStampScore, and the earlier-computed IsolatedNormalizedStampScore, and we apply the stamp at the location of that maximum, within BinSignalTile (i.e., ORing the stamp and the BinSignalTile).

As before, we zero out all locations in ContSignalTile under the stamp location, to prevent this location from being selected again. Additionally, we zero out all locations in IsolatedNormalizedStampScore within a keep-out distance of the just-identified stamp location. We then test for a termination condition (e.g., a threshold number of iterations), and if the condition is not met, we repeat the steps of this paragraph.

Figure 21A:
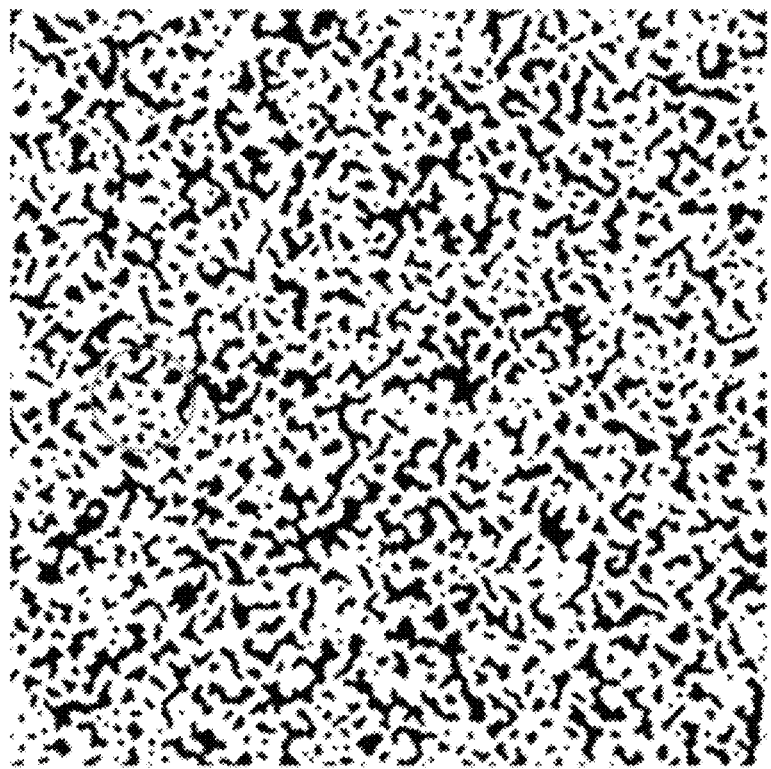
FIG. 21A shows a binary pattern of spikes, produced by a variant of the FIG. 18 algorithm.
Figure 21B:
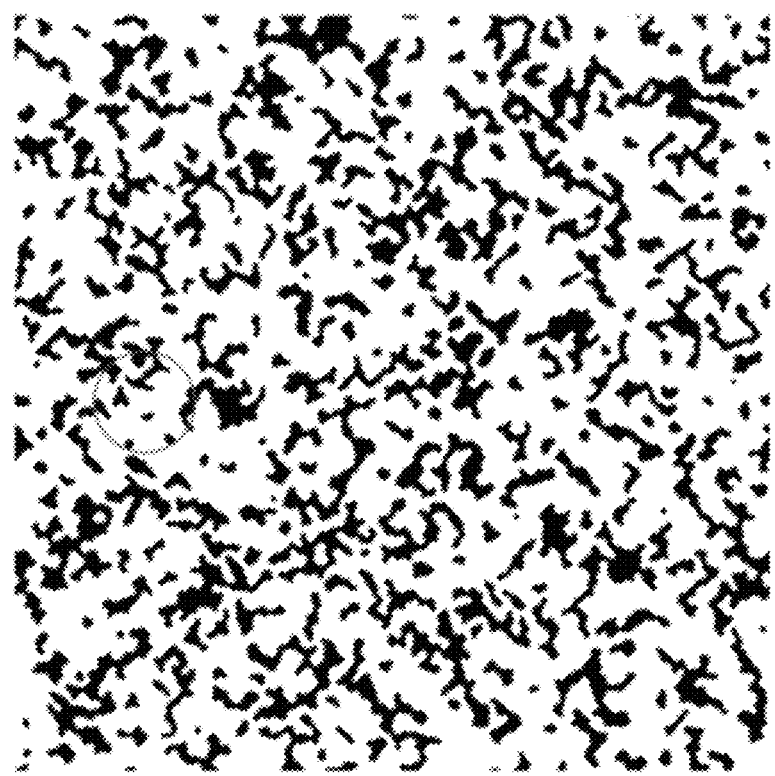
FIG. 21B shows the same pattern as FIG. 21A, but generated using a keep-out constraint of 0.068 inches.

FIGS. 21A and 21B show the difference the keep-out parameter makes. FIG. 21A shows application of the algorithm to develop a pattern of spikes (shown in black) without a keep-out constraint (i.e., a keep-out value of zero), and FIG. 21B is the same but with a keep-out value of 0.068 inches.

Figure 22A:
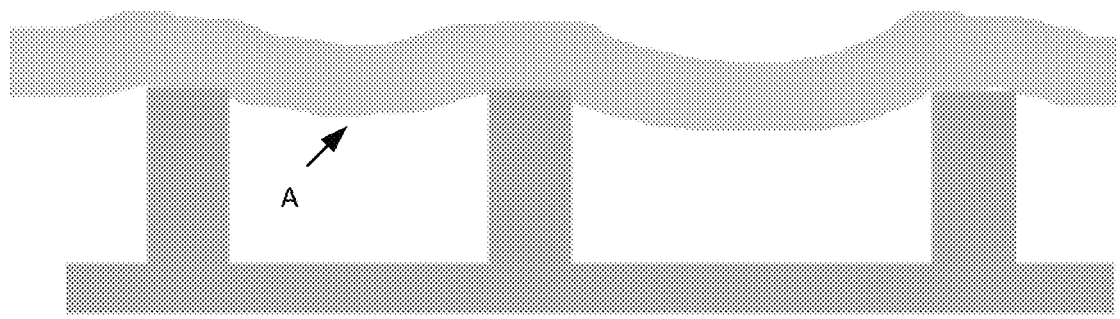
FIGS. 22A and 22B show two physical phenomena that contribute to shaping of a thermoplastic sheet by a pattern of protruding spikes.
Figure 22B:
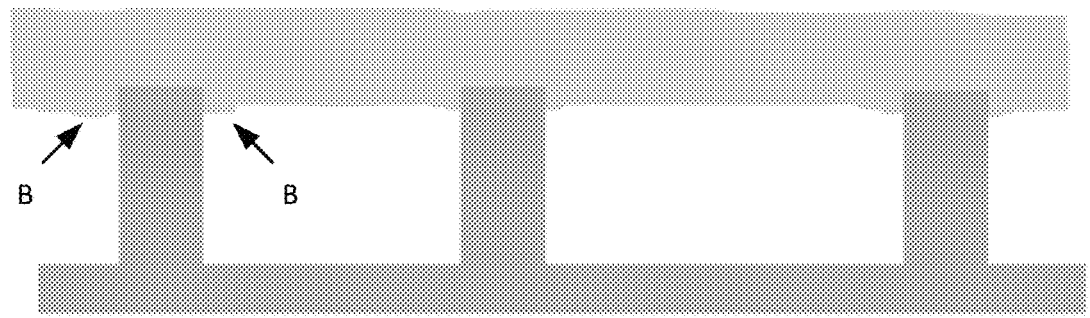

There are two shaping mechanisms that are operative simultaneously when shaping plastic with protrusions. FIGS. 22A and 22B illustrate, using the simple case of flat-topped spikes, but the same principles are generally applicable. The first mechanism is thermoplastic flow of the plastic under pressure, causing the molded surface of the plastic to deflect below the tops of the spikes, as shown at "A" in FIG. 22A. The second mechanism is displacement of the plastic material where the spike is urged into the plastic by the applied pressure. This displacement gives rise to a region of bulged material around the spike, as shown at "B" in FIG. 22B. In the case of a spike that is circular in cross-section, this region manifests itself as a raised circular ridge or rim around the hole that is left protruding from the shaped plastic surface that was adjacent to the mold. These two effects combine to yield a surface contour that is raised in a ring ("B") immediately around the indentation caused by the spike. Surrounding such ring is an area of plastic that is not so prominently-raised. And in the region indentations the surface is more gently-bowed up, in the same direction as the ring, corresponding to the deflection (A) of the viscous plastic.

Figure 23:
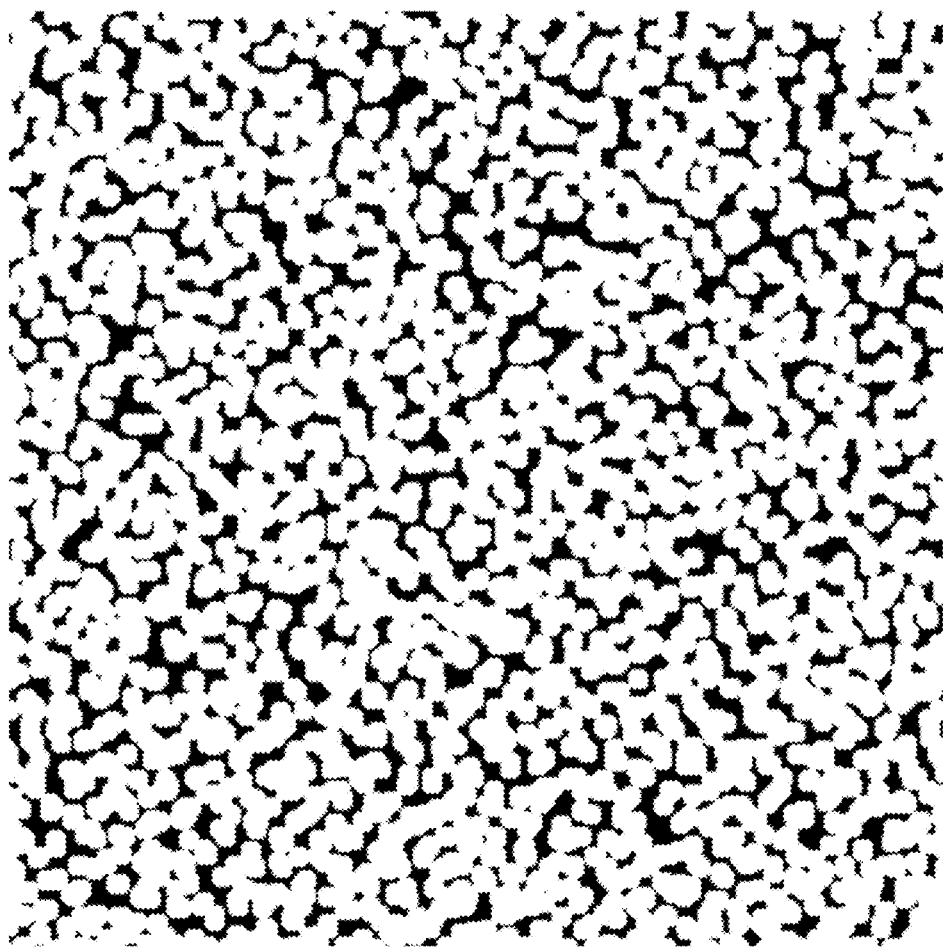
FIG. 23 shows a binary pattern of holes that, when used to shape a mold surface, leaves protrusions of fine dimensions remaining.

FIG. 23 shows a binary pattern in which a majority of the mold surface area is machined away, e.g., by drilling and routing (the white areas), leaving the original, elevated mold material remaining at a minority of areas (the black area). Such pattern is advantageous in the sense that hot plastic can readily flow into the relatively large voids left by such extensive machining of the mold surface. A problem can arise during use, however, in that the remaining excerpts of the original mold surface that protrude up into the hot pressurized plastic can be quite small places, making them mechanically frail.

Figure 23A:
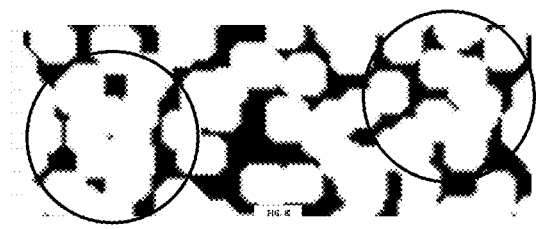
FIG. 23A is an enlarged excerpt from FIG. 23, showing some of the finely-dimensioned protrusions.

Consider, for example, the enlarged excerpt shown in FIG. 23A. In the center of the left-most circled area is a tiny area of the original mold surface—protruding up and surrounded by void. This virtual thread of aluminum can quickly be bent or otherwise mis-shapen after repeated pressure cycles. Consider, too, the feature at the center of the right-most circled area. This thin shim of metal, extending to the southeast, will also have a limited service lifetime.

In such instances it is desirable to control the minimum dimension of remaining features, to extend the life of the mold. This can be done by a smoothing operation. One such smoothing operation—applicable to any binary pattern—involves successive dilation and erosion.

An illustrative method dilates every marked pixel in the pattern by 1, 3, or 10 pixels. (Recognize that a marked pixel may be white, as in the white holes of FIG. 23.) For example, each marked pixel is replaced by a 3×3 patch of marked pixels, i.e., dilated in each direction by 1 pixel. A dot remote from others becomes an isolated 3×3 patch. Each grouping of contiguous dots becomes an enlarged blob. Any solitary unmarked pixel surrounded by marked pixels will be filled-in with marking by the dilation operation.

Next, a reciprocal erosion operation is performed. While some features will be restored to their original appearances, others (e.g., the filled-in area solitary unmarked pixel) will not. Dilation is thus not completely reversed by erosion.

Such dilation-erosion cycle can be applied repeatedly, a few, a few dozen, or a few hundred times. Each cycle tends to yield a successively smoother pattern The dilation-erosion method can be applied to any binary pattern. For example, it can be applied to the patterns of FIGS. 15, 19, 21A and 23. This technique tends to reduce the prevalence of small features and sharp angles. So doing extends the useful life of the resulting mold, but at the cost of a slight reduction in robustness of the reference and payload signals. The artisan can select the number of dilation-erosion cycles applied, and the size of the operator (e.g., 1, 3 or 10 pixels) to trade-off mold lifetime versus signal robustness.

FIG. 24A shows a binary pattern produced by the same method as FIG. 15, and FIG. 24B shows the same pattern after an illustrative application of the just-detailed dilation-erosion method. The circled area shows how a close grouping of three isolated dots in FIG. 24A becomes a connected clump of dots in FIG. 24B.

In a variant arrangement, dilation-erosion is applied during creation of the binary pattern. Returning to the earlier-described process for forming a binary pattern of FIG. 15, a first mark is placed at a location in a 512×512 output array corresponding to the most-extreme (e.g., darkest) value of a continuous-tone signal block. And then a second mark is placed at the next-most-extreme location, and a third mark is placed at the next-most-extreme location, etc. At intervals during this process, e.g., after every 100, 10, or even 1 mark is added to the output array, the dilation-erosion process is applied. The dilation-erosion process can be applied to the entire signal block as then composed, or may only be applied to a region centered around the most-recently added mark.

Dilation-erosion can likewise be used at intervals in the connected binary pattern algorithm shown in FIG. 18, and in the variant discussed for spike embodiments.

FIG. 25A shows a binary pattern formed by this variant technique—applying a dilation-erosion operator size of 1 after each mark has been added. FIGS. 25B, 25C and 25D are similar, but employing dilation-erosion operators of size of 2, 3 and 5, respectively. Note how larger operators yield a reduction in the number of features in the block, an increase in the size of most black areas, and an increase in the size of most white areas. Typically, the total marked area (here black) reduces with greater operator size.

It is much easier for hot plastic to flow among and be shaped by the features of FIG. 25D than those of FIG. 25A. (The result of such smoothing sometimes appears as an animal skin, e.g., a leopard skin, giving rise to the nickname of a "leopard pattern.")

Attached to U.S. priority application 63/076,917 is sample Matlab code illustrating aspects of the foregoing.

CONCLUDING REMARKS

Having described and illustrated the principles of applicant's inventive work with reference to illustrative features and examples, it will be recognized that the technology is not so limited.

For example, while the specification describes various techniques independently, applicant intends that they be used in combination. For example, the connected binary mark detailed in the Further Disclosure section can be used in any of the embodiments disclosed in earlier sections of the specification.

Similarly, while marks are commonly placed at locations corresponding to minima in a continuous-tone watermark signal (i.e., the smallest, or most negative values—indicating the darkest locations), the opposite approach can be employed. Marks can instead be placed in a binary watermark pattern at locations where the corresponding continuous-tone watermark is light instead of dark. (Imaging of plastics often yields an inversion, in which the marks appear light against a darker background of surrounding unmarked, smooth plastic surface. Thus, many watermark detectors look for signals expressed in both forms: normal and inverted.)

The references to a watermark pattern comprising a square 128×128 array of locations is for purposes of illustration only. A watermark pattern can comprise a larger or smaller array of locations, and need not be square in shape.

Although the described embodiments employ a reference signal comprised of peaks in the spatial frequency (Fourier magnitude) domain, it should be recognized that reference signals can exhibit fixed features in different transform domains by which geometric synchronization can be achieved.

Relatedly, it is not necessary for a digital watermark signal to include a distinct reference signal for geometrical synchronization purposes. Sometimes the payload portion of the watermark signal, itself, has known aspects or structure that enables geometrical synchronization without reliance on a separate reference signal.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this document, a watermark is a 2D code produced through a process that represents a message of N symbols using K output symbols, where the ratio N/K is less than 0.25. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

As indicated, in one particular embodiment, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding the 1024 bits referenced earlier (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a most watermarks is typically a function of the synchronization signal. Again in contrast, synchronization in QR codes is achieved by alignment patterns placed at three corners and at certain intermediate cells. Message data is expressed at none of these locations.

Patterns that can be impressed in plastic by thermoforming include "signal rich art" patterns, such as are detailed in U.S. patent publications 20190213705, 20190378235 and 20200311505. For example, a binary pattern can be formed as a stipple pattern, a Voronoi pattern, a Delaunay pattern, etc.

While reference was made to thermoforming a sheet of PET plastic having a thickness of 0.2-0.4 mm, it will be understood that such dimensions are illustrative of just a few particular embodiments. In other embodiments the shaped sheet may be up to, e.g., 1.5 mm in thickness.

Similarly, while an elemental feature width of 0.169 mm was referenced (which corresponds to watermark elements, or waxels, at 150/inch), it should be understood that waxels of between half and twice this size may also commonly be used (i.e., between 0.085 mm and 0.338 mm, corresponding to 300-75 waxels/inch).

Naturally, while the connected binary form of 2D code is described in the context of a plastic surface texture, it will be understood that such a connected binary code can likewise be implemented otherwise, such as by printing on a substrate.

In some embodiments of the present technology, the mold used for thermoforming is anodized, e.g., to increase its life. Relatedly, in some embodiments, smooth surfaces of the mold are sandblasted or otherwise processed to slightly increase the surface roughness, which can aid with release of the molded plastic part. (Typically, the magnitude of such surface roughness is less than 10% of the variation in surface level caused by the watermark signal.)

While certain embodiments of the technology are described as employing an artwork file that defines several mold elevations, this is not essential. A first binary file can indicate locations where the mold is to be milled to a first level. After the mold has been shaped in accordance with this file, a second binary file is employed—this one indicating locations where the mold is to be milled to a second level. The once-shaped mold is further shaped in accordance with this second file. And so forth. One such binary file can indicate locations where the mold is to be milled with thru-holes for venting. A plurality of artwork files are thus successively-employed by a milling system to shape the mold.

Some thermoformed items have different wall thicknesses at different locations. For example, a clamshell food container may have a base that is thicker than its sidewalls. In such case, the PET sheet can be molded to include differently-sized protrusions and/or depressions in accordance with the respective wall thicknesses (i.e., protrusions of greater height, and depressions of lesser depth, in the base in the cited clamshell).

Figure 13:
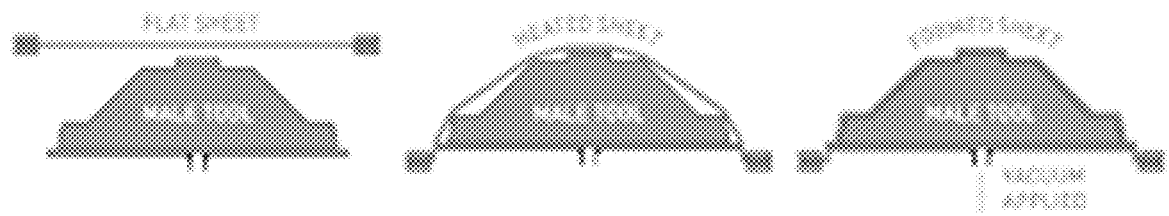
FIG. 13 shows various means by which a shaping force can be applied to a moldable material to urge it against a mold surface.
Figure 13:
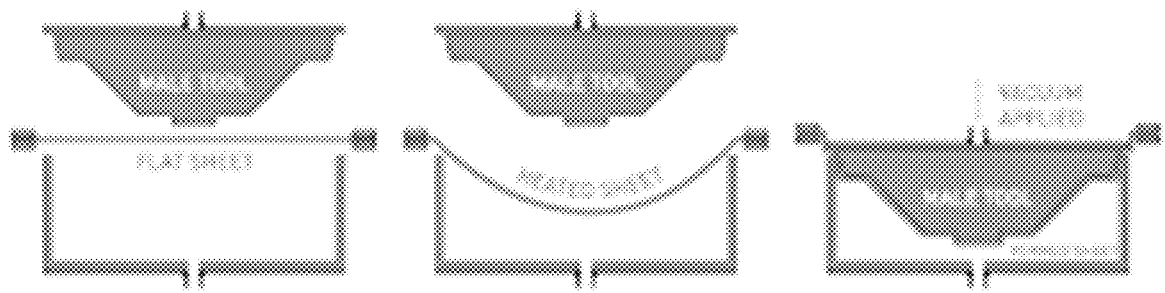
Figure 13:
Figure 13:
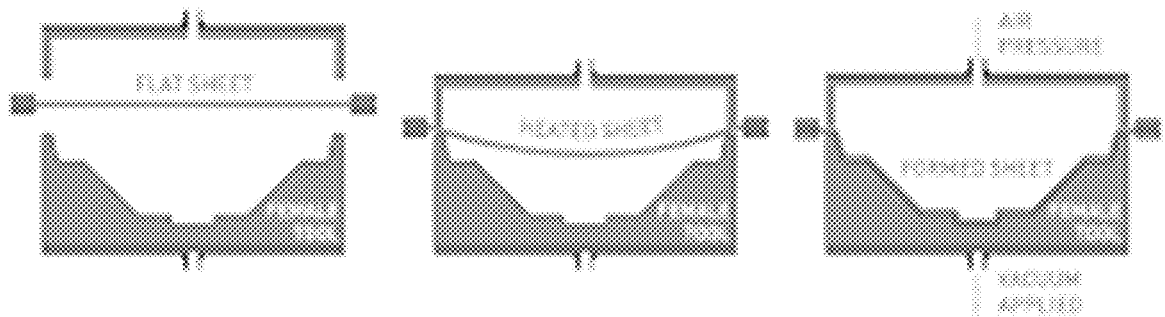

While the specification describes pressure-based thermoforming methods, other means of applying a shaping force to a moldable sheet employ vacuum-based methods. Various such pressure- and vacuum-forming arrangements are shown in FIG. 13. Combinations thereof can also be employed, e.g., applying pressure to a sheet from above to press it towards a molding surface, and applying a vacuum to the opposite side of the sheet to draw it towards the molding surface.

Similarly, while the detailed embodiments concern thermoforming techniques, principles thereof are likewise applicable in other shaping technologies, such as injection molding, blow molding, rotational molding, etc. Moreover, materials other than PET resins can be so-shaped, including other plastics (e.g., polymethyl methacrylate (PMMA), polycarbonate (PC), polyethylene (PE), polypropylene (PP), polystyrene (PS), and polyvinyl chloride (PVC)), as well as other materials, such as fiber-reinforced composites, and metals.

Again, it should be emphasized that the present disclosure builds on, and incorporates, the disclosures cited herein. For example, although not belabored, it will be understood that the pattern of protrusions or depressions formed by the detailed molding methods can correspond to marks comprising binary watermark patterns, as detailed in U.S. patent application Ser. Nos. 16/405,621 (issued as U.S. Pat. No. 11,062,108) and 17/214,455 (issued as U.S. Pat. No. 11,741,733). To make the protrusions and depressions more pronounced, a dilation operation can be applied to marks in patterns produced by such algorithms (while maintaining the same number of waxels per inch), in acknowledgement that some fidelity is lost in the thermoforming processing. For example, the mark areas can be dilated by 10%, 30%, 50% or even 100%.

The types of items that may be marked using the present technology is essentially without limit. Clamshell food containers, lids, trays, pouches, transport containers, etc., are just a few examples.

Thermoforming has a long and extensive literature, dating back to the 1930s and 1940s. See, e.g., U.S. Pat. Nos. 2,123,552, 2,142,445, 2,367,642 and 2,365,637—all to Edward Helwig. More recent examples include U.S. Pat. Nos. 3,733,309, 4,128,369, 4,423,000, 4,496,408, and 5,730,914.

While the specification focuses on molds for plastic containers, e.g., shaped with features formed by drilling and routing, the technology is not so limited. Removal of material from a mold can be effected otherwise, such as by laser marking (etching), chemical treatments (such as acid etching), electrical discharge machining (so-called "spark erosion"), other forms of CNC machining, etc. And as noted, a mold can fashioned to have protrusions at locations where voids were formed in the earlier-detailed embodiments. (Watermark detectors used in plastic recycling applications are typically indifferent as to signal polarity, so '1's and '0's, and peaks/valleys, can be swapped without consequence.)

Although this specification has repeatedly referenced shaping plastic containers, it will be recognized that the technology can be used in connection with non-plastic items, such as glass, metal, paper, etc.

Although the technology has been illustrated with reference to binary patterns derived from continuous-tone patterns (e.g., formed by interpolating a payload pattern and summing with a reference signal pattern in a weighted sum), other techniques for forming continuous-tone patterns are known (e.g., from the cited documents). Similarly, binary patterns can be formed by methods other than those discussed above (e.g., again from the cited documents). Moreover, it is not essential that a binary pattern be formed of dots, pixels or stamps positioned in a cartesian coordinate system.

It will be understood that the data processing methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The methods and algorithms detailed above can be implemented in a variety of different hardware processors, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above-detailed processes on a microprocessor—such as selecting marks in clustered arrangement—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to select mark locations in clusters, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of watermark detectors and decoders offer higher performance, and consume less power, than implementations employing microprocessors. A drawback, however, is the significant time and expense required to design and fabricate circuitry that is tailor-made for one particular application.

A particular implementation of any of the above-referenced processes using an ASIC again begins by defining the sequence of operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Still another type of processor hardware is a neural network chip, e.g., the Intel Nervana NNP-T, NNP-I and Loihi chips, the Google Edge TPU chip, and the Brainchip Akida neuromorphic SOC.

Software instructions for implementing the detailed functionality on the selected hardware can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

The invention claimed is:

1. A substrate marked with a pattern of elements defining a binary signal pattern, the binary signal pattern comprising a first square pattern block that is tiled edge-to-edge with other square pattern blocks to span an area, the edges of the first square pattern block defining two perpendicular directions, wherein said binary signal pattern comprises one or more first elements each having a template shape spanning a first area, and one or more second elements each spanning a larger area that is a non-integral multiple of the first area, wherein one of said second elements is shaped as a union of said template shape and a duplicate of said template shape, overlapped in area by an amount equal to more than 50% of said first area spanned by the template shape, and wherein respective centers of said overlapped template shape and duplicate template shape are offset from each other in both of said two perpendicular directions, by differing distances.

2. A substrate according to claim 1, wherein the substrate is a mold, and in which said one or more first elements and said one or more second elements each forms an indentation or protrusion in a surface of the mold.

3. A substrate according to claim 1, wherein the substrate is a container, and in which said one or more first elements and said one or more second elements each forms an indentation or protrusion in a surface of the container.

4. The container of claim 3 comprising PET plastic having a thickness of 0.2-0.4 mm.

5. The container of claim 3 comprising plastic having a thickness of 0.2-1.5 mm.

6. A container according to claim 3, wherein the container is a plastic clamshell food container comprising a base and sidewalls, both of which are marked with said one or more first elements and said one or more second elements, wherein each of said one or more first elements and one or more second elements form an indentation or protrusion having a respective depth or height dimension, wherein the base is thicker than the sidewalls, and wherein dimensions of said one or more first elements in the base have larger dimensions than said one or more first elements in the sidewalls.

7. The substrate of claim 1 in which said one or more first elements and said one or more second elements are marked by printing.

8. The substrate of claim 1 in which said one or more second elements each comprises two or more overlapping first elements of the one or more first elements.

9. The substrate of claim 1 in which a second element comprises a first element that was enlarged to form the second element.

10. The substrate of claim 1 in which all of the first elements have a common width between 0.005 inches and 0.02 inches.

11. The substrate of claim 1 in which said first square pattern block includes two of said first elements and two of said second elements.

12. The substrate of claim 11 in which a combined count of between 150 and 2500 of said one or more first elements and said one or more second elements are distributed throughout the first square pattern block.

13. The substrate of claim 11 in which a second element of the one or more second elements comprises a shape that is different than a shape of a first element of the one or more first elements.

14. The substrate of claim 11 in which all of the first elements distributed throughout the first square pattern block have a common shape, while plural of the second elements distributed throughout the first square pattern block have different shapes.

15. The substrate of claim 11 in which the first square pattern block is between 0.43 and 1.7 inches on a side.

16. The substrate of claim 1 in which said binary signal pattern encodes a plural-symbol message.

17. The substrate of claim 1 in which the pattern of elements defining the binary signal pattern comprises digital watermarking.

18. A substrate marked with a pattern of elements defining a binary signal pattern, wherein said binary signal pattern comprises one or more first elements each having a template shape spanning a first area, and one or more second elements each spanning a larger area that is a non-integral multiple of the first area, wherein one of said one or more second elements is shaped as a union of said template shape and a duplicate of said template shape, overlapped in area by an amount equal to more than 50% of said first area spanned by the template shape, wherein the binary signal pattern comprises a first 2D pattern block that is tiled edge-to-edge with other 2D pattern blocks, said first 2D pattern block including at least two of said first elements and at least two of said second elements, and a combined count of between 150 and 2500 of said first elements and second elements.

19. The substrate according to claim 18, wherein the substrate comprises a plastic food container, and in which said one or more first elements and said one or more second elements each forms an indentation or protrusion in a surface of the plastic food container.

20. A plastic food container according to claim 19, wherein the plastic food container comprises a plastic clamshell food container comprising a base and sidewalls, both of which are marked with said one or more first elements and said one or more second elements, wherein each of said one or more first elements and one or more second elements form an indentation or protrusion having a respective depth or height dimension, wherein the base is thicker than the sidewalls, and wherein dimensions of said one or more first elements in the base have larger dimensions than said one or more first elements in the sidewalls.

21. The substrate of claim 18 in which the binary signal pattern encodes a plural-symbol message.

22. The substrate of claim 18 in which the pattern of elements defining the binary signal pattern comprises digital watermarking.

23. A plastic food container having a surface textured with a pattern of elements, the pattern of elements defining a binary signal pattern, wherein said binary signal pattern comprises one or more first elements each having a template shape spanning a first area, and one or more second elements each spanning a larger area that is a non-integral multiple of the first area, wherein one of said one or more second elements is shaped as a union of said template shape and a duplicate of said template shape, overlapped in area by an amount equal to more than 50% of said first area spanned by the template shape, wherein the binary signal pattern comprises a first 2D pattern block that is tiled edge-to-edge with other 2D pattern blocks, said first 2D pattern block including at least two of said first elements and at least two of said second elements, and a combined count of between 150 and 2500 of said first elements and second elements.

24. The plastic food container according to claim 23 in which said one or more first elements and said one or more second elements each forms an indentation or protrusion in a surface of the plastic food container.

25. The plastic food container according to claim 24 comprising a plastic clamshell food container comprising a base and sidewalls, both of which are marked with said one or more first elements and said one or more second elements, wherein each of said one or more first elements and one or more second elements form an indentation or protrusion having a respective depth or height dimension, wherein the base is thicker than the sidewalls, and wherein dimensions of said one or more first elements in the base have larger dimensions than said one or more first elements in the sidewalls.

26. The substrate of claim 23 in which the binary signal pattern encodes a plural-symbol message.

27. The substrate of claim 23 in which the pattern of elements defining the binary signal pattern comprises digital watermarking.

* * * * *